United States Patent [19]
Houser et al.

[11] Patent Number: 5,606,609
[45] Date of Patent: Feb. 25, 1997

[54] ELECTRONIC DOCUMENT VERIFICATION SYSTEM AND METHOD

[75] Inventors: Peter B. Houser, Poway; James M. Adler, Ocean Beach, both of Calif.

[73] Assignee: Scientific-Atlanta, Norcross, Ga.

[21] Appl. No.: 306,447

[22] Filed: Sep. 19, 1994

[51] Int. Cl.$^6$ .................................................. H04L 9/00
[52] U.S. Cl. .................................................. 380/4; 380/25
[58] Field of Search .................................. 380/23, 54, 4, 380/25

[56] References Cited

U.S. PATENT DOCUMENTS

| | | |
|---|---|---|
| 4,202,626 | 5/1980 | Mayer, Jr. et al. |
| 4,206,315 | 6/1980 | Matyas et al. |
| 4,218,582 | 8/1980 | Hellman et al. |
| 4,309,569 | 1/1982 | Merkle . |
| 4,376,299 | 3/1983 | Rivest . |
| 4,467,139 | 8/1984 | Mollier . |
| 4,625,076 | 11/1986 | Okamoto et al. |
| 4,633,036 | 12/1986 | Hellman et al. |
| 4,656,474 | 4/1987 | Mollier et al. |
| 4,691,299 | 9/1987 | Rivest et al. |
| 4,736,423 | 4/1988 | Matyas . |
| 4,748,668 | 5/1988 | Shamir et al. |
| 4,807,287 | 2/1989 | Tucker et al. |
| 4,837,737 | 6/1989 | Watanabe . |
| 4,853,961 | 8/1989 | Pastor . |
| 4,868,877 | 9/1989 | Fischer . |
| 4,885,777 | 12/1989 | Takaragi et al. |
| 4,908,861 | 3/1990 | Brachtl et al. |
| 4,908,873 | 3/1990 | Philibert et al. |
| 4,919,545 | 4/1990 | Yu . |
| 4,926,479 | 5/1990 | Goldwasser et al. |
| 4,932,056 | 6/1990 | Shamir . |
| 4,965,827 | 10/1990 | McDonald . |
| 4,969,189 | 11/1990 | Ohta et al. |
| 4,981,370 | 1/1991 | Dziewit et al. |
| 4,987,593 | 1/1991 | Chaum . |
| 4,991,210 | 2/1991 | Chaum . |

(List continued on next page.)

OTHER PUBLICATIONS

"Date Encryption Standard (DES)", U.S. Department of Commerce, Technology Administration, National Institute of Standards and Technology, Federal Information Processing Standards Publication 46–2, Dec. 30, 1993, pp. 1–18.

"Digital Signature Standard (DSS)", U.S. Department of Commerce, National Institute of Standards and Technology, Federal Information Processing Standards Publication, May 19, 1994, pp. 1–20.

"Secure Hash Standard", U.S. Department of Commerce, Technology Administration, National Institute of Standards and Technology, Federal Information Processing Standards Publication 180, May 11, 1993, pp. 1–20.

*Primary Examiner*—David C. Cain
*Attorney, Agent, or Firm*—Banner & Witcoff, Ltd.

[57] ABSTRACT

The integrity or the signator of an electronic document can be verified by embedding a security object, for example, supported by an object linking and embedding (OLE) capability, in the electronic document at a location selected by the signator. The embedded security object includes security information and an identifier for invoking the processing of the security information. The security information may include a document digest that characterizes the electronic document at the time the security object was embedded, a signature digest that identifies the signator and that characterizes the instance of the embedded security object, and the signator's electronic chop, which may be the signator's digitized signature or other graphic image. In addition, the security information can be encrypted using either private key encryption or public key encryption. When the electronic document is later displayed, the identifier invokes processing that decrypts the security information and calculates the document digest based on the current state of the electronic document. The signator of the electronic document can be verified based upon the result of the decryption. The integrity of the electronic document can be verified if the decrypted document digest matches the calculated document digest. If the signator and the document integrity are confirmed, the electronic chop is displayed in the document. If, however, the signator or document integrity are not verified, the electronic chop is not displayed. In addition, a warning message may be displayed if verification fails.

68 Claims, 14 Drawing Sheets

U.S. PATENT DOCUMENTS

| | | |
|---|---|---|
| 4,995,082 | 2/1991 | Schnorr . |
| 4,996,711 | 2/1991 | Chaum . |
| 5,005,200 | 4/1991 | Fischer . |
| 5,018,196 | 5/1991 | Takaragi et al. . |
| 5,027,414 | 6/1991 | Hilton . |
| 5,031,214 | 7/1991 | Dziewit et al. . |
| 5,097,504 | 3/1992 | Camion et al. . |
| 5,136,646 | 8/1992 | Haber et al. . |
| 5,136,647 | 8/1992 | Haber et al. . |
| 5,138,140 | 8/1992 | Siemiatkowski et al. . |
| 5,140,634 | 8/1992 | Guillou et al. . |
| 5,144,667 | 9/1992 | Pogue, Jr. et al. . |
| 5,146,500 | 9/1992 | Maurer . |
| 5,171,040 | 12/1992 | Orndorff . |
| 5,189,700 | 2/1993 | Blandford . |
| 5,191,613 | 3/1993 | Graziano et al. . |
| 5,193,853 | 3/1993 | Wicker . |
| 5,195,133 | 3/1993 | Kapp et al. . |
| 5,197,765 | 3/1993 | Mowry, Jr. et al. . |
| 5,199,744 | 4/1993 | Shenton . |
| 5,208,858 | 5/1993 | Vollert et al. . |
| 5,214,696 | 5/1993 | Keiser, II et al. . |
| 5,218,637 | 6/1993 | Angebaud et al. . |
| 5,222,138 | 6/1993 | Balabon et al. . |
| 5,223,677 | 6/1993 | Kapp et al. . |
| 5,245,657 | 9/1993 | Sakurai . |
| 5,259,025 | 11/1993 | Monroe et al. . |
| 5,268,963 | 12/1993 | Monroe et al. . |
| 5,289,540 | 2/1994 | Jones . |
| 5,291,243 | 3/1994 | Heckman et al. . |
| 5,295,188 | 3/1994 | Wilson et al. . |
| 5,297,202 | 3/1994 | Kapp et al. . |
| 5,297,206 | 3/1994 | Orton . |
| 5,299,263 | 3/1994 | Beller et al. . |
| 5,311,595 | 5/1994 | Bjerrum et al. . |
| 5,319,710 | 6/1994 | Atalla et al. . |
| 5,373,561 | 12/1994 | Haber et al. . |

ELECTRONIC DOCUMENT VERIFICATION SYSTEM AND METHOD

FIELD OF THE INVENTION

The invention generally relates to a system and method for indicating authenticity in connection with computer operations. In one application, the present invention relates to a system and method for verifying and indicating the integrity, source, and/or approval status of an electronic document, and more particularly to a method and apparatus for embedding a security object including security information into an electronic document and for using the embedded security object to invoke verification processing of the security information and the electronic document to verify the integrity, source, and/or approval status of the electronic document, and for using the results of the verification processing to control the display of video or printed indicia to thereby indicate the verification results to a user.

BACKGROUND OF THE INVENTION

Computer networks are being used extensively to enable groups of two or more people to communicate. For example, many offices utilize local area networks that enable employees to communicate with each other via electronic mail. In addition, individual computers or local area networks may be linked to form a broad-based network to facilitate communications between remote persons. The Internet is but one example of such a broad-based network.

One effect of the increasing use of computer networks for communication is that electronic documents are fast replacing paper documents in both business and non-business environments. For example, letters and routine business forms can be represented in electronic form. In addition, specifications and control drawings, spreadsheets and other electronic forms, artwork or blueprints, video images and the output from electronic scanners can be generated and transferred as electronic documents using computers. Moreover, electronic representation of documents will increase as automated equipment becomes more prevalent in offices and homes.

Paper documents are typically signed or initialed and, in many cases, dated by the author or reviewer using a pen or other indelible marker. In this way, the signator manifests his or her approval of the document as it exists at that time. The signature or initials can be examined at a later time by an expert, the signator, or another familiar with the signature to verify whether the purported signator actually signed the document. Moreover, alteration of paper documents, for example, after signing, is difficult because the printed words are fixed on the paper.

Like paper documents, many electronic documents are circulated among several persons who may be asked to comment on, approve, confirm, or otherwise acknowledge the electronic document. Some electronic documents are generated co-operatively by several authors. Consequently, it is often desirable to confirm who originated and/or who approved an electronic document. It also may be important to establish the time at which the particular electronic document was generated, approved, or confirmed and to ensure that the electronic document was not altered after origination or approval. However, without some form of protection, electronic documents are easily altered or forged in a manner that may escape detection.

One solution to this problem may be to simply "sign" the electronic document. Signatures may be captured in electronic form using a digitizer, and the digitized signature may then be pasted into an electronic document. The digitized signature may thereafter be displayed within the document on a computer display. Alternatively, the digitized signature may be printed in the document using a standard printer. Accordingly, as used herein, "digitized signature" refers to an electronic graphic representation of a signature obtained using a digitizer, for example, and to the display or print out of such electronic graphic representation. A major disadvantage of using stored digitized signatures is that they can be copied easily from one document to another in a manner which escapes detection. Accordingly, widespread forgery of digitized signatures cannot be prevented.

The disadvantage identified above, among others, have led to a search for alternative means to provide security for electronic documents. One alternative technique is embodied in document configuration management systems, which provide security by using a software-implemented locking mechanism that locks documents into a software library. A document is "signed" by checking it out of the library, modifying it if desired, then checking it back into the software library with appropriate comments. The party that checked out and returned the document may be considered to have "approved" it. The returned document can then be viewed by other users with confidence that it has not been modified since it was last replaced.

The document configuration management systems provide a very high degree of security and are useful for managing sensitive documents such as time cards in a corporation. However, document configuration management systems suffer from numerous disadvantages. For example, they require a central configuration management server that must be available to all users. Linking all users to the central configuration management server is impractical for loosely coupled systems, such as the Internet. Accordingly, document configuration management systems are ill-suited for widespread use by unaffiliated or loosely affiliated users.

A second generally known technique for providing electronic document security is referred to as public key encryption. Many specific types of public key encryption techniques are known. For example, the National Institute of Science and Technology (NIST) has adopted a Digital Signature Standard based on public key encryption. So-called "electronic signature" techniques should be carefully distinguished from the digitized signature technique discussed above. An electronic signature, as used herein and commonly throughout the industry, refers to a block of electronic information, e.g., a bit sequence, which strongly characterizes the state of a document at a particular time, and is typically generated using a secure hashing algorithm. As discussed further below, the electronic information is encrypted using the signator's private key within a public key encryption technique. Subsequent successful decryption and hash confirmation by the recipient verifies the integrity of the document and identity of the signator. On the other hand, a digitized signature, as discussed above, is an electronic graphic representation of an individual's handwritten signature which likewise may be used to identify the signator, but by visual inspection.

In private key encryption techniques, the private key is not mathematically related to any other key. Accordingly, the private key is required for decryption. In general, public key encryption techniques use a public key and a private key that are mathematically related. However, it is practically impossible to derive the private key from the public key. As the name suggests, the public key can be known by anyone and the private key is secret and should be protected from modification and disclosure.

Any person having the public key, the message, and the electronic signature can verify integrity of the document and confirm the signator. Security is ensured because it is computationally infeasible to find an electronic document that corresponds to the information generated using a secure hash algorithm, or to find two different electronic documents that produce the same secure hash output value. Thus, any change in the electronic document will, to a very high degree of probability, result in a different secure hash output value. Such a technique provides very secure verification of the source and integrity of an electronic document.

Existing techniques having electronic signature or document configuration management capabilities provide more security than is required. In addition, current systems enable high-confidence verification by the recipient of the electronic document for each transaction. However, high-confidence verification is unnecessary for the vast majority of transactions. By analogy, a handwritten signature can be fairly easily imitated to deceive a casual recipient, though subsequent examination by an expert or the alleged signator is likely to reveal the forgery. Nonetheless, forgery of any sort is very rare in a business environment. Accordingly, security measures which provide a moderate likelihood of detecting deception are effective for deterring forgery or alterations. Therefore, for the vast majority of electronic communications, only a moderate level of security is required, and verification of "signatures" may not be needed unless the document's integrity is subsequently questioned.

Further, electronic signature and document configuration management systems which provide document security do not currently work within the structure of today's highly integrated electronic office tool sets, and are not easy to use, particularly for computer novices. Electronic signature algorithms, for example, which involve extremely complex mathematics, presume a very sophisticated and experienced computer user. Little effort has been expended to make such techniques accessible to the average computer user, who has a relatively low level of computer expertise. Accordingly, there is a need for electronic data security techniques that are user-friendly, that provide a sufficient degree of security that will deter forgery and alterations, and that can be used in a wide variety of computer systems.

SUMMARY OF THE INVENTION

The present invention overcomes the deficiencies in the prior art described above and others by providing an electronic document verification method and system having a security information assembler that, responsive to a user's request, assembles security information into a predetermined format. A security object embedder embeds a security object, including the assembled security information and an identifier for invoking processing of the security information, into an electronic document at a location selected by the user. In this way, the electronic document may be "signed" by the user.

The electronic document verification system also includes an embedded security information extractor that, responsive to an embedded security object in a signed electronic document, extracts security information from the embedded security object. A verification processor then processes the extracted security information to verify at least one aspect of the signed electronic document. In other words, the verification processor verifies the "signature" in the electronic document.

In order to increase confidence in the verification process, the security information may be encrypted using an encrypter before it is embedded in the electronic document. Further, the security information extracted from the embedded security object may be decrypted using a decrypter before verification processing. Public key encryption techniques, private key encryption techniques, or both, may be used to protect the security information.

Moreover, the security information may include a document digest and/or a signature digest. The document digest includes one or more data items that characterize the electronic document at the time the security object is embedded, such as a hash value. The signature digest includes one or more data items that characterize the signator or the instance of the embedded security object, such as a serial number that is unique for each embedded security object.

For example, the security information assembler may include a hash value calculator for calculating a hash value of the target electronic document, and the calculated hash value may be included in the assembled security information. In addition, the verification processor may include a hash value calculator for calculating a hash value of the signed document. A comparator may compare the calculated hash value with a hash value in the extracted security information. A verification detector, responsive to the comparator, may detect that the signed electronic document was modified if the calculated hash value differs from the hash value in the extracted security information and may detect that the signed electronic document was not modified if the calculated hash value matches the hash value in the extracted security information.

A serial number generator may be provided for generating a unique serial number that may be included in the security information and stored in a memory for future reference. Accordingly, the verification processor may include a comparator which compares a serial number in the extracted security information with the stored serial number. A verification detector may then detect that the signed electronic document is authentic if the stored serial number matches the serial number in the extracted security information and may detect that the signed electronic document is not authentic if the stored serial number does not match the serial number in the extracted security number.

An electronic chop also may be provided in the security information. If so, the electronic document verification system may include a display controller for controlling a display device to display the electronic chop in the signed electronic document only if the verification processor verifies the signed electronic document. The electronic document verification system may further include a watermark generator for generating a watermark graphic. For example, the watermark graphic may be generated using the extracted security information and/or may be a time-dependent graphic. The display controller may thus control the display device to display the electronic chop superimposed on the watermark graphic if the verification processor verifies the signed electronic document.

In a further aspect of the present invention, an apparatus and method for embedding information in an electronic document is provided. The apparatus for embedding information includes a security information assembler that assembles security information into a predetermined format and a security object embedder that embeds the security information and information for invoking a predetermined application for processing the security information in an electronic document at a location selected by the user.

The security information may be encrypted according to public or private key encryption and may include an electronic chop associated with the user. The security information may also include a document digest having at least one data item that characterizes the current state of the electronic document, such as a hash value of the electronic document or a characterization of the text portion of the electronic document. A serial number generator may provided to generate a serial number for inclusion in the security information. Moreover, the security information may include information indicative of the apparatus itself.

As a further aspect of the present invention, an embedded object interpreter and corresponding method is provided to verify an electronic document. The embedded object interpreter includes a security information extractor that extracts security information from an embedded security object and a verification processor for verifying at least one aspect of the electronic document using the extracted security information. The extracted security information may be decrypted using a private key or a public key before verification. Where the security information includes a serial number, the verification processor may use the serial number to verify the identity of the party that caused the security information to be embedded in the electronic document. The extracted security information may include a value indicative of an object embedder that embedded the security object in the electronic document. In such a case, the verification processor may use this value to verify the authenticity of the object embedder.

A document digest may be included in the security information. The document digest includes a data item that characterizes the content of the electronic document at the time that the security information was embedded. Accordingly, the verification processor may verify the integrity of the electronic document using the extracted document digest. More specifically, the verification processor may include a calculator for calculating a data item that characterizes the current content of the electronic document and a comparator for comparing the data item in the extracted security information with the calculated data item. A verification detector, responsive to the comparator, may then detect that the electronic document was modified if the extracted data item does not match the calculated data item and may detect that the electronic document was not modified if the extracted data item matches the calculated data item. For example, the extracted data item may be an embedded hash value and the calculated data item may be a calculated hash value.

The security information may further include an electronic chop associated with a party that caused the security information to be embedded in the electronic document. A display controller may be provided to control a display device to display the electronic chop in the electronic document only if the verification processor verifies the electronic document. In addition, the embedded object interpreter may include a watermark generator for generating a watermark graphic, for example, using the extracted security information. The watermark graphic may be a time-dependent graphic. Accordingly, the display controller may therefore control the display device to display the electronic chop superimposed on the watermark graphic. Alternatively, the watermark generator may be separately provided to generate a time-dependent watermark graphic for display on a user's computer display.

In another aspect of the present invention, an electronic document verification system is provided with a verification processor for verifying at least one aspect of an electronic document approved by a signator and an indication controller that presents a chop graphic associated with the signator in the electronic document only if the verification processor verifies the aspect of the electronic document. The chop graphic is omitted from the electronic document if the verification processor contradicts the aspect of the electronic document. The verification processor may verify, for example, the integrity of the electronic document and/or the source and approval status of the electronic document.

The electronic document may be displayed on a display. In such a case, the indication controller controls the display to display a video chop graphic associated with the signator in the displayed electronic document only if the verification processor verifies the aspect of the electronic document. The electronic document verification system may also include an electronic watermark generator that generates an electronic watermark that produces a video watermark when displayed. The electronic watermark may include information related to the signator and the electronic document and/or a time-varying icon. The indication controller may then control the display to display the video chop graphic superimposed over the video watermark in the displayed electronic document.

Alternatively or in addition, the electronic document may be printed using a printer. Thus, the indication controller may control the printer to print a printed chop graphic associated with the signator in the printed electronic document only if the verification processor verifies the aspect of the electronic document. The electronic document verification system may include an electronic watermark generator that generates an electronic watermark which produces a printed watermark when printed using the printer. The electronic watermark may include information related to the signator and the electronic document, for example, in a small font so as to appear substantially as a gray area. Moreover, the information may be provided in a random format to inhibit subsequent modification. The indication controller controls the printer to print the printed chop graphic superimposed over the printed watermark in the printed electronic document.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

Figure 1:
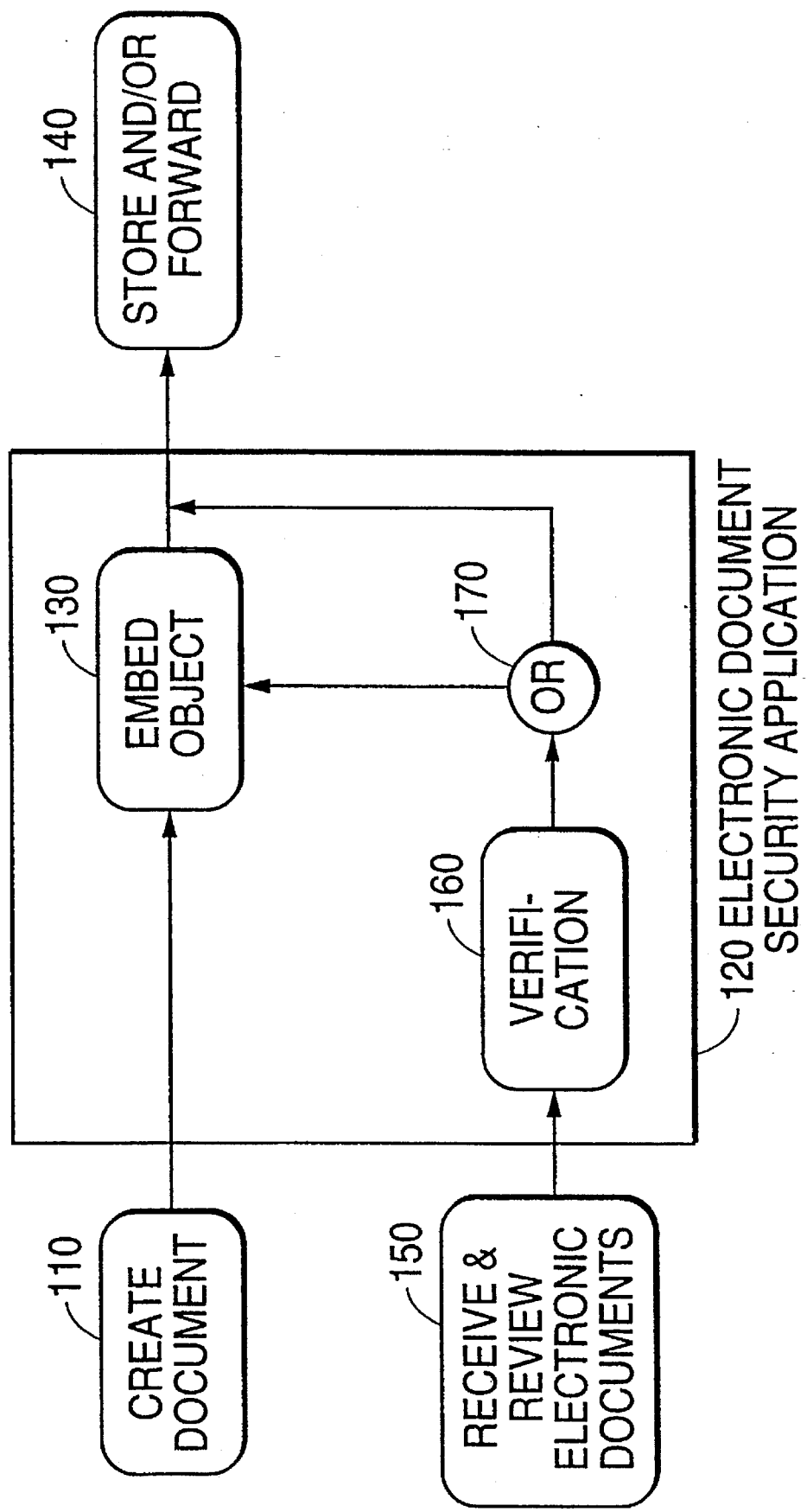
FIG. 1 illustrates a fundamental operation cycle for using the present invention.

FIG. 1 illustrates the fundamental operation cycle of the present invention. An electronic document is created at 110 using any conventional application, for example, Word for Windows™, Amipro™, Powerpoint™, Excel™, Microsoft Windows Paintbrush™, among numerous others. Of course, the specific application used to generate the electronic document should not be considered to limit the present invention. The electronic document may be any type of document, such as a letter, an expense report, a travel document, a time card, a purchasing or sales agreement, a specification or control drawing, an image, a spreadsheet or other electronic form, artwork or a blueprint. It should be clear that the present invention is not limited by the type of document created.

After the document is created, an electronic document security application 120 may be used to embed a security object in the electronic document as represented at 130. The embedded security object includes security information and an identifier for invoking verification processing of the security information to verify at least one aspect or characteristic of the electronic document, for example, document integrity and/or the identity of one or more "signators" who embedded security objects in the electronic document. As will be discussed below, the operating system of the computer, responsive to the identifier, may invoke processing of the security information in the embedded security object. Alternatively, the identifier may be executable code that invokes processing directly or indirectly, e.g., by invoking a verification processing application.

The security information may include a document digest, a signature digest, or both. A document digest, as used herein, provides one or more data items that characterize the electronic document at the time the security object is embedded. A signature digest, as used herein, provides one or more data items which identify the signator, characterize the instance of the embedded security object, and/or may be used to generate a watermark, such as a video watermark. The security information may also include an electronic chop, as will be described in greater detail below. A video chop on a display may be generated based upon the information of the electronic chop. Further, the electronic chop may be used to generate a printed chop, for example, on paper. In other words, the video and printed chops may be video and print representations of the electronic chop information.

Of course, multiple security objects may be embedded in a single electronic document. The "signed" electronic document (i.e., the electronic document including one or more embedded security objects) may be stored and/or transmitted to another party as represented at 140.

When the signed electronic document is received or recalled from memory at 150, verification processing in the electronic security application 120 is invoked by the identifier in the embedded security object at 160. While FIG. 1 illustrates that verification processing is performed by the electronic document security application that embedded the security object, another electronic document security application may perform the verification processing. Such an arrangement is desirable, in fact, because it facilitates communication of electronic documents between users. The document digest in the embedded security object may be used to verify whether the document was altered after the security object was embedded. Alternatively or in addition, the signature digest in the embedded security object may be used to verify the identity of the signators. The electronic chop may be selectively displayed within the electronic document based on the verification processing result. Accordingly, a document reviewer, who may be the signator or another who receives or otherwise accesses the signed electronic document, can examine the result of the verification processing on the computer display, for example, by looking for the electronic chop in the electronic document.

As a further measure of security, the document digest and/or signature digest may be used to generate an electronic watermark. The electronic watermark may generate a video watermark when displayed on a video display or a printed watermark when printed, for example, on paper. The electronic watermark may comprise a formatted version of the document and/or signature digest information, or may be based upon a complex mathematical algorithm, as will be described in greater detail below. In any event, the video chop may be superimposed over the video watermark and the printed chop may be printed over the printed watermark to provide a detection capability and thereby deter attempts at the falsifying a "signature".

Thereafter, the document reviewer may peruse the signed electronic document or perform other processing using the signed electronic document. As indicated at 170, the document reviewer may then "sign" the document by embedding an additional security object therein as indicated at 130. Alternatively, the document reviewer can store and/or forward the document as indicated at 140.

Figure 2:
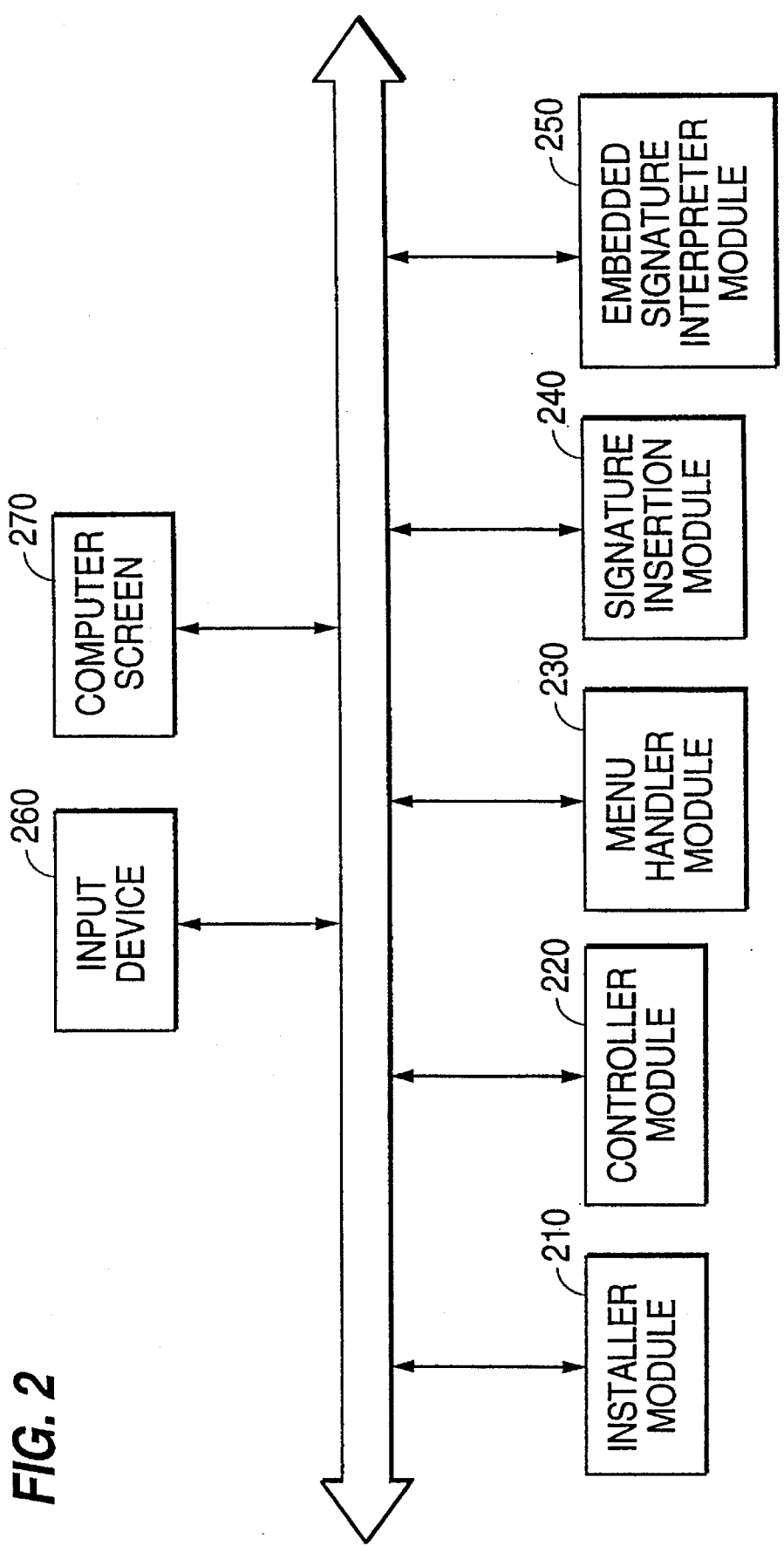
FIG. 2 provides a graphic representation of the components of one preferred embodiment of the electronic document security application illustrated in FIG. 1.

FIG. 2 provides a graphic representation of the components of one preferred embodiment of the electronic document security application 120 illustrated in FIG. 1. The electronic document security application includes an installer module 210, a controller module 220, a menu handler module 230, a signature insertion module 240, and an embedded signature interpreter 250. The user may interact with the electronic document security application 120 via an input device 260 and a display 270.

The electronic security application may be implemented using a standard computer, such as an IBM PC-compatible computer (e.g., 33 MHz 80486 processor, 8 Mbyte RAM, 300 Mbyte hardrive) using DOS™ in conjunction with WINDOWS™ 3.1, which supports OLE 2.0. Both DOS™ and WINDOWS™ 3.1 are available from Microsoft Corporation of Redmond, Wash. The computer also preferably includes a display (e.g., 640×480 pixel resolution color VGA monitor) and a keyboard for facilitating user interaction. The computer may be coupled to a local area network (LAN) such as ETHERNET™ and a wide area network (WAN) such as the Internet to facilitate communication with other computers. The installer module 210 is provided for controlling installation in a user's computer. The computer may also form a part of a larger system, such as a photographic image system, for example.

Of course, such a standard hardware suite represents only a single embodiment of the invention. Other embodiments might host the application on a different hardware suite, or split portions of the application across multiple pieces of hardware. For example, digital scanners and video frame grabbers produce electronic files which may be later modified in a manner difficult to detect. The security object could be calculated, assembled, and embedded into the output data by the digital scanner or video frame grabber, allowing subsequent viewers with object extraction and verification capability to assure themselves that the image was original.

Figure 3A:
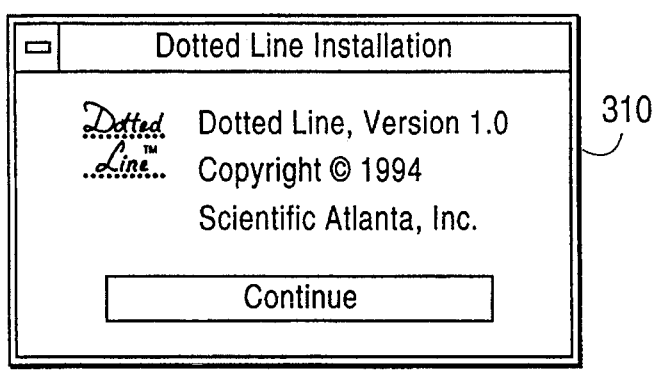
FIGS. 3A–3H illustrate a series of interactive dialogs by which installation of the electronic document security application can be facilitated.

An installation disk may be used to install the electronic document security application according to known techniques. The installation process may be facilitated by a series of interactive dialogs illustrated in FIGS. 3A–3H. For example, FIG. 3A illustrates an initial dialog screen 310 provided for the user, for example, upon insertion of the installation disk into the user's disk drive and entry of an <install> command. The installer module may create a directory structure in the user's system and then save electronic document security application executable files in the appropriate directories.

Figure 3B:
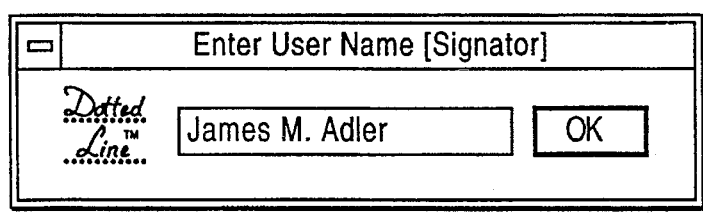
Figure 3C:
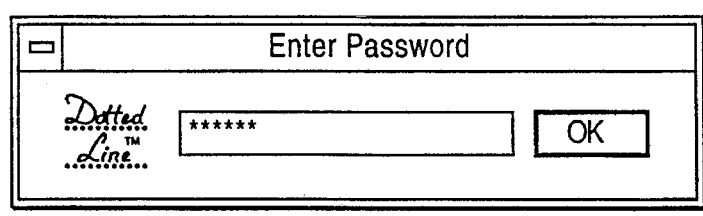
Figure 3D:
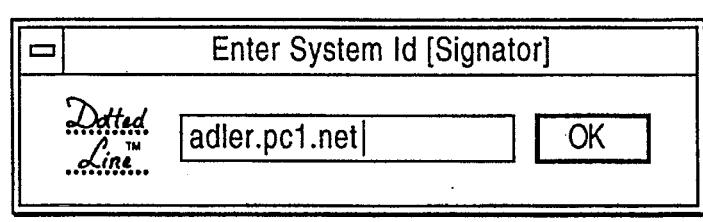
Figure 3E:
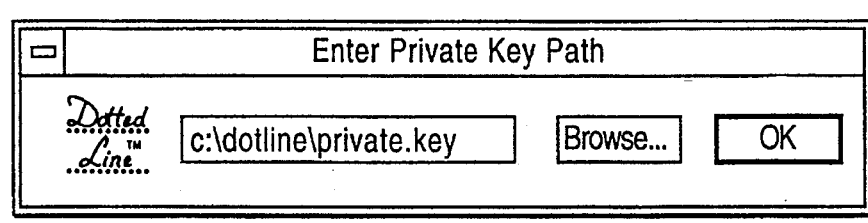
Figure 3F:
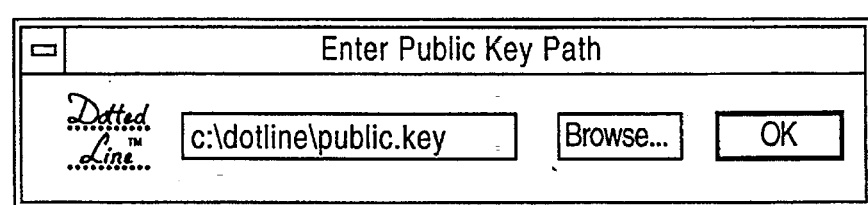
Figure 3G:
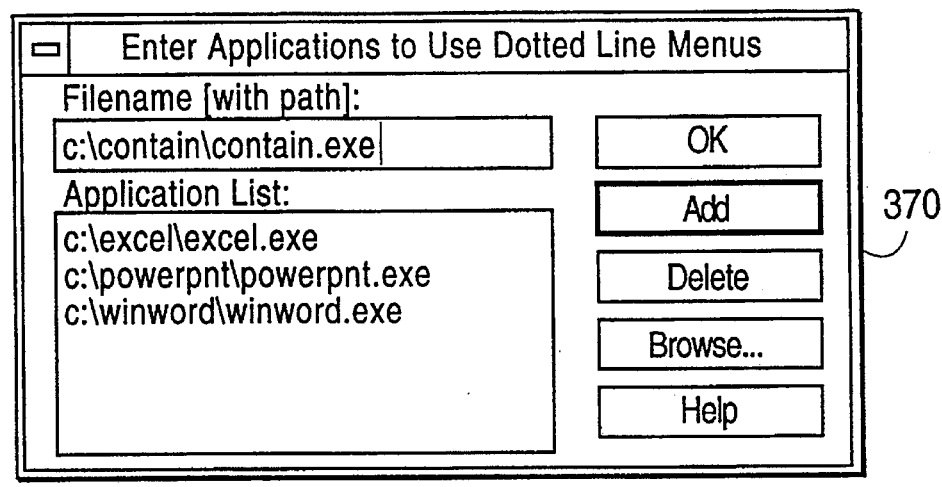

In addition, the installer module 210 may perform several preliminary functions associated with the operation of the electronic document security application. For example, the installer module 210 may prompt the user to enter his name and an access password by displaying an interactive dialog on a computer display 270. FIGS. 3B and 3C illustrate dialogs 320 and 330 that simplify entry of the user's name and access password, respectively. The name and access password may be entered using an input device such as a keyboard, mouse, tracking ball, or other conventional input device. The access password serves to prevent unauthorized access to the various features of the electronic document security application, such as the signature insertion module 240. Further, as indicated in FIG. 3D, the user may be prompted to enter a system identification using an interactive dialog 340.

In addition, a private key and/or a public key pair may be entered by the user to encrypt information stored with the electronic document security application and/or information embedded into an electronic document. The password may or may not be equivalent to the private key. If the password is not equivalent to the private key, the password may be used to encrypt or otherwise protect the private key. In one preferred embodiment, private and public keys are generated using the access password. Further, the access password may be used to control access to the public and private keys. The private key may be created, encrypted using the access password, and stored in a location selected by the user, for example, using an interactive dialog 350 illustrated in FIG. 3E. The public key of the public key pair may be stored in a separate location selected by the user. The private key of the public key pair may be generated, encrypted using the access password, and stored in a third location selected by the user, for example, using the interactive dialog 360 illustrated in FIG. 3F. As noted, the user may specify the various default paths used for accessing the public and private keys when required. For example, the public key of the public key pair may be stored in a single directory commonly accessible to numerous users, as in a typical LAN.

In one preferred embodiment, each of an access password entered by the signator, a private key for private key encryption, and a public key encryption pair are utilized. The access password controls access to the public and private keys and to the various features of electronic document security application, such as the signature insertion module 240.

The installer module 210 also may prompt the user to identify one or more applications for producing electronic documents to be used in conjunction with the electronic document security application 120. This may be accomplished using the dialog 370 illustrated in FIG. 3G, for example. The installer module 210 may then modify the <Edit> pull-down menu of the one or more user-specified applications to include <Insert Signature> and/or <Scrutinize Signature> items. Accordingly, when the user runs a specified application after installation, the user can select any included menu items from the <Edit> pull-down menu displayed on the display 270. Additional details concerning this feature will be discussed below. Of course, the basic capabilities of the user specified applications may be modified in other ways to enable implementation of the electronic document security application.

The controller module 220 controls the various capabilities that may be provided which are not associated with actual insertion or verification processes. For example, the controller module 220 may be used for performing electronic chop registration and for permitting examination of the signature log, among other possible features.

In performing electronic chop registration, the controller module 220 enables selection of an electronic chop, which may be an arbitrary static graphic object for use as the user's personal electronic indicia. Electronic chop registration also may be performed during installation. For example, the installer module 210 may invoke the controller module 220 before it terminates. The electronic chop may be generated by word processors, scanners, or graphic tools. For example, the electronic chop may be a digitized rendering of the user's signature or initials. In the WINDOWS™ operating environment, bit maps (.bmp and .pcx extensions), tagged image format files (.tif extension), and scalable image files (.wmf extension) may be used as the signator's electronic chop. Of course, the invention should not be limited to these file types.

Figure 3H:
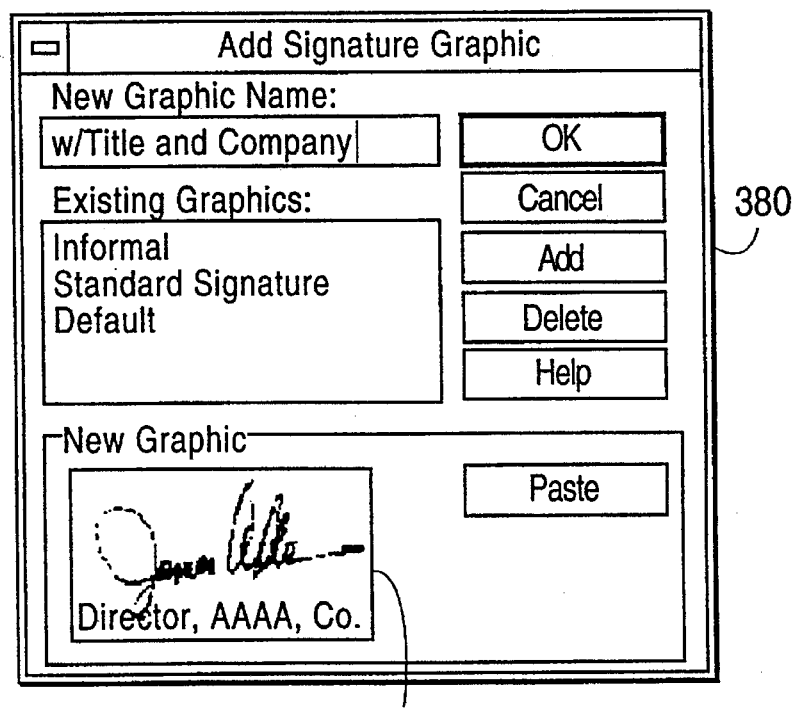

The electronic chop may be registered in a user-friendly manner using the input device 260 and one or more interactive screens on computer display 270. FIG. 3H illustrates an interactive dialog 380 that may be used to facilitate electronic chop registration and deletion. As illustrated in FIG. 3H, each user may have several electronic chops from which to choose. For example, the user may have a formal signature, initials, and a casual scrawl. Also, an electronic chop may be registered by transferring a graphic object from the WINDOWS™ Clipboard to the controller module 220. In one preferred embodiment, the controller module 220 is implemented in a modular manner to ensure flexibility for additional or multiple file types as the electronic chop.

The user may verify the appearance of the electronic chop as part of the registration process as illustrated FIG. 3H, in which the dialog 380 includes a graphic box 382 in which the electronic chop is displayed. In addition, the electronic chop may be changed after initial selection, and this change shall not affect the behavior of electronic chops included in previously embedded security objects when displayed or printed. Of course, changing the electronic chop may require entry of the appropriate password or private key.

Figure 4A:
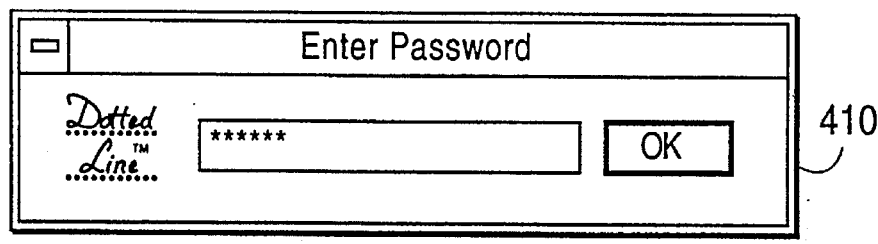
FIGS. 4A–4C illustrate displays for the signature log according to one preferred embodiment of the invention.
Figure 4B:
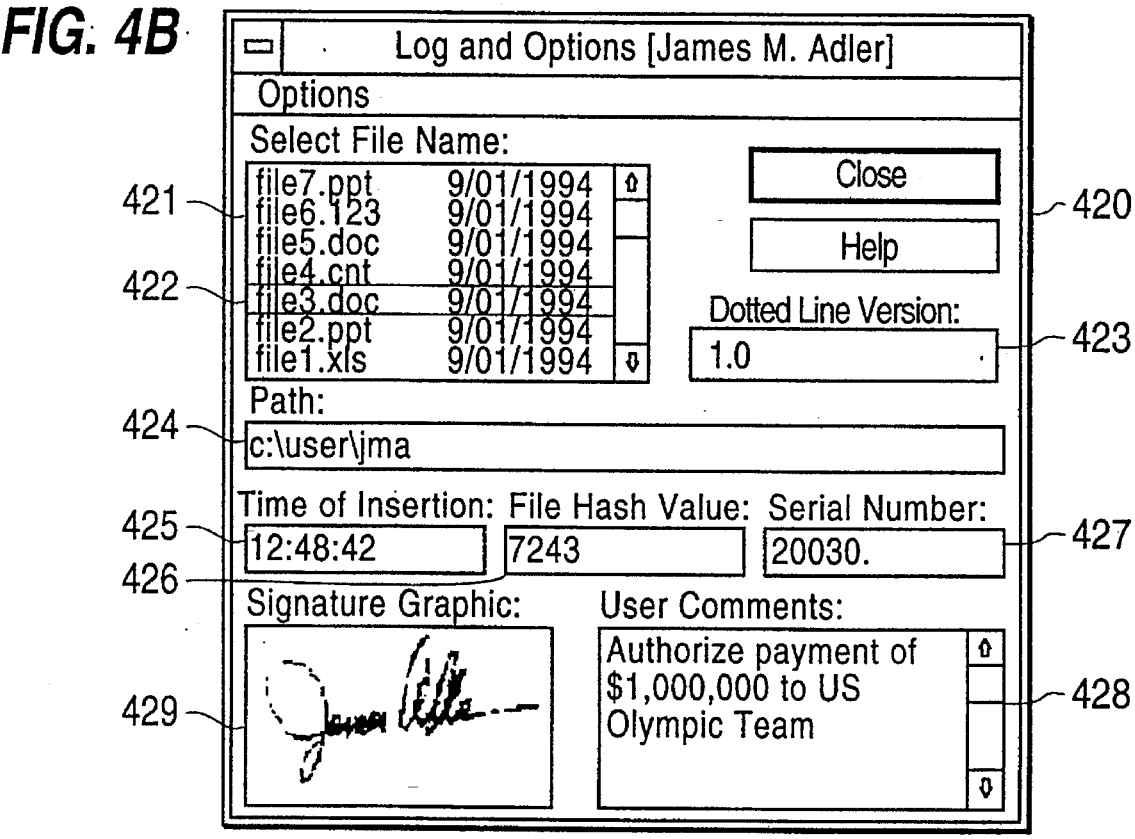
Figure 4C:
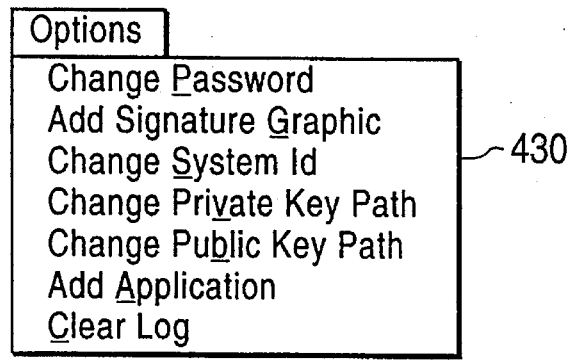

As noted above, the controller module 220 also maintains a signature log including security information generated each time a security object is embedded into an electronic document by the user. The signature log enables the user to examine the security information embedded into each electronic document signed by the user. For example, FIGS. 4A–4C illustrate dialogs used in implementing the signature log according to one preferred embodiment of the invention. If the signature log is encrypted, for example, using the user's private key, the user may be required to provide their password in order to prevent unauthorized access. This may be facilitated using dialog 410 illustrated in FIG. 4A. Encryption provides additional confidence that entries in the signature log are not modified after creation or created outside of the electronic document security application. In one preferred embodiment, the signature log may be encrypted using the Digital Encryption Standard (DES) adopted by NIST.

FIG. 4B illustrates a signature log dialog 420 provided upon proper entry of the user's password. As illustrated, the signature log display may provide various security information items concerning documents "signed" by the user. For example, the user may be provided with a box 421 having a list of the documents in which security objects were embedded. The box 421 may have a cursor 422 that the signator may use to select any of the signed documents. Additional boxes 423, 424, 425, 426, 427 and 428 may provide the version of the electronic document security application used to embed the security object, the path to the document, the time of insertion, the file hash value, the serial number and comments. The signator may also view the electronic chop in a box 429. FIG. 4C illustrates a dialog 430 including the options that may be available to the user via the <Options> pull-down menu shown in FIG. 4B. According to the selection made by the user, the controller module 220 may change passwords, add electronic chops, change system identifications, private keys, or public keys. The user may also add applications usable with the electronic document security application or clear the log. Of course, selection of any of the <Options> may invoke a corresponding interactive dialog, such as those illustrated in FIGS. 3C–3G.

The menu handler module 230 initiates processing based upon user selection of the electronic document security application-related menu items created by the installer module 210 during installation. Thus, the menu handler module 230 serves as an interface between the application used to create or view the electronic document and the electronic document security application. The operation of the menu handler 230 will be discussed in greater detail below.

Prior to describing the signature insertion module 240 and the embedded signature interpreter module 250, the embedded security object will be described. In general, the embedded security object includes security information and an identifier for invoking verification processing of the security information. The verification processing may verify whether the electronic document was modified at any time after the security object was embedded and/or may verify the identity of the signator.

Figure 5:
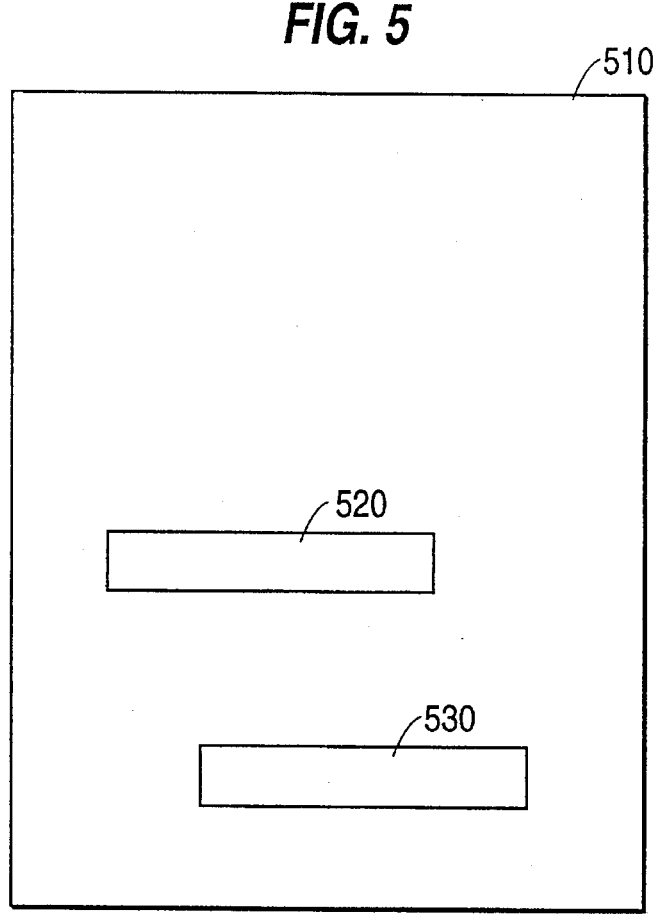
FIG. 5 illustrates an electronic document having security objects embedded therein in accordance with the present invention.

As seen in FIG. 5, an electronic document 510 may be a text file created by any conventional application, as noted above. In general, text files include text portions having character information and printing and code portions that control characteristics of the text portions, such as a font, pagination, etc. Of course, the electronic document 510 may be a graphics file, a sound recording file, color or black-and-white photographic-quality images or video images, multimedia capabilities, text or other data, or any combination thereof. By interaction of the signature insertion module 240, information can be embedded into the electronic document 510 at a location selected by the user. This can be accomplished in the WINDOWS™ operating environment using object linking and embedding (OLE) feature, preferably OLE version 2.0. Microsoft Corporation has additionally made the OLE feature available for use with Mcintosh™ computers made by Apple Computer Inc. of Cupertino, Calif. When used with the OLE feature, the embedded security object may be an OLE object. The OLE security object has an identifier that invokes the embedded signature interpreter module 250 when an attempt is made to display or print the portion of the electronic document including the embedded OLE security object, as will be discussed in greater detail below. The embedded signature interpreter module 250 then performs the various verification processing operations described below using the security information in the embedded OLE security object.

Of course, the present invention may be implemented with any other mechanism for invoking an executable function that can be embedded in an electronic document, for example, OpenDoc™ available from Apple Computer Inc. of Cupertino, Calif. For convenience, the remainder of the discussion will refer to OLE only. However, it should be understood that the discussion encompasses other mechanisms as well.

In general, the security object may be embedded at any location within or appended to the electronic document. Different applications used to create the electronic document 510 may handle OLE security objects in different ways. For example, the OLE security object may be inserted in its entirety into the electronic document. FIG. 5 illustrates an example of an OLE security object 520 inserted into the document 510. A OLE object 530 is included in electronic document 510 to illustrate that the document may include multiple OLE security objects.

Depending on how the OLE security object is handled by the application that creates the document, discrete locations may be defined on the document before actual insertion of any security objects in order to provide for the addition of multiple OLE security objects. Alternatively, the electronic document may be stored without any security objects embedded therein. In addition, the hashing function may be implemented such that the embedded security objects are assigned a null value. Accordingly, the presence or absence of security objects will not influence the hash calculation.

The content of the security object may vary depending on the information required by the features provided. For example, the security object may include a document digest that includes one or more data items that characterize the electronic document at the time the security object is embedded. For example, the document digest may include document file name, document file path, the number of characters per page or in the document, the date and time that the document was saved, a checksum value, the number of pages in the document, a hash value of the entire document, a hash value of the printed characters of the document, other document specific information, or any combination of the above. The hash value may be computed, for example, using the Secure Hash Standard adopted by NIST.

The security object may include, in addition or in the alternative, a signature digest including one or more data items which identify the signator and/or characterize or relate to the instance of the embedded security object. For example, the signature digest may include the signator's name, other information specific to the signator such as local access network (LAN) user name, LAN subdirectory specification or an Internet address, system identification, the date and time of that the security object is embedded, a serial number assigned to the instance of the embedded security object, information identifying the version of the electronic document security application, the signator's comments, information relating to the generation of time-varying data, other information relating to the security object embedding event, or any combination thereof. In addition, the security object may include the electronic chop.

In one preferred embodiment, the security information includes a document digest, a signature digest, and the electronic chop. In particular, the document digest may include a hash value of the electronic document, electronic document name and path, number of pages, number of characters per page, and the date and time the document was saved. The signature digest may include user name, system identification, serial number, the version of the electronic document security application that created the security information, user comments, and date and time that the security object was embedded. As will be discussed further below, the security information may be encrypted, in whole or in part, using private key encryption or public key encryption. In one preferred embodiment, the security object includes three copies of the same information: one unencrypted copy, one copy encrypted using private key encryption, and one copy encrypted using public key encryption.

Figure 6:
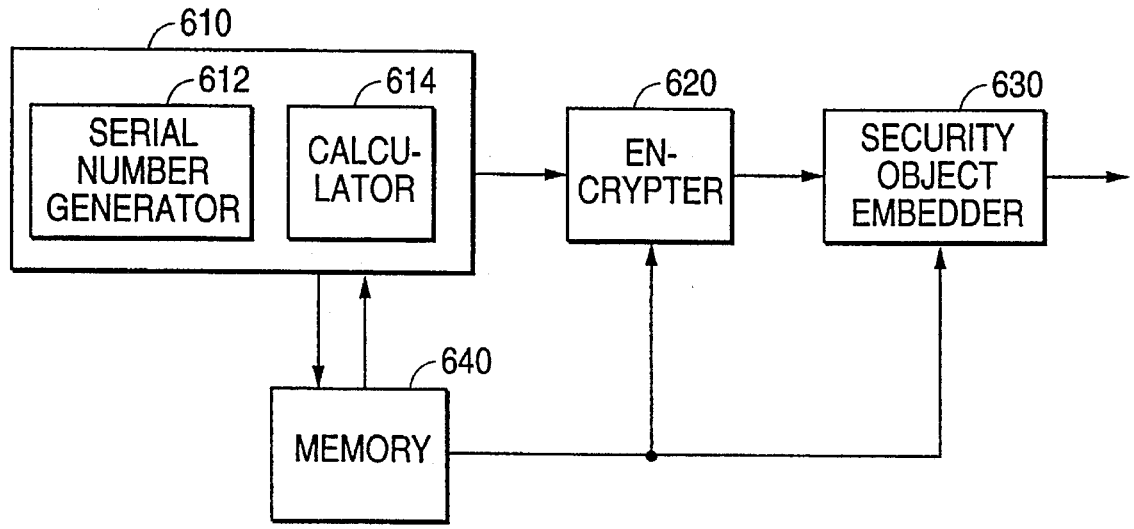
FIG. 6 provides a representation of an embodiment of the signature insertion module illustrated in FIG. 2.
Figure 7A:
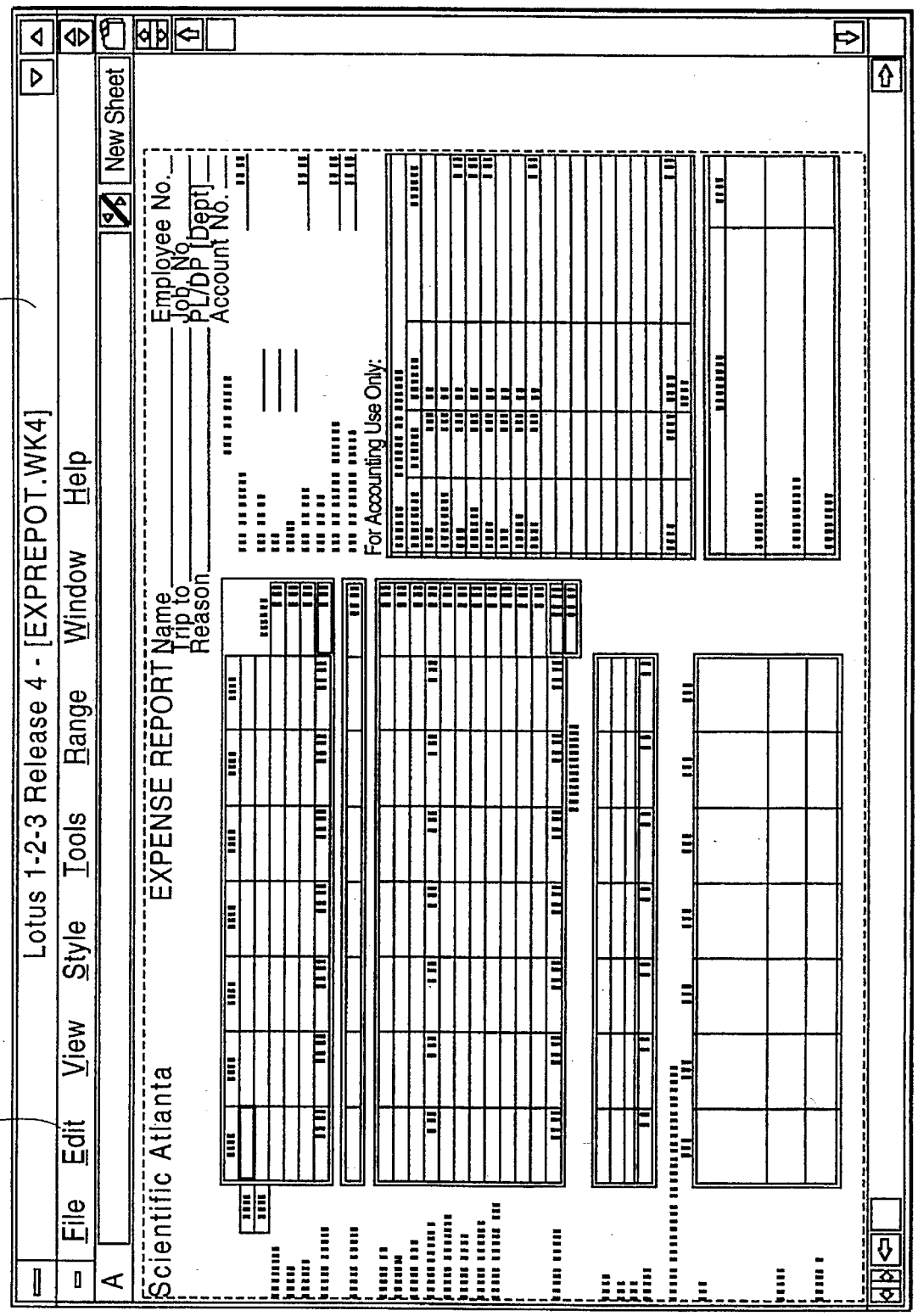
FIGS. 7A–7E illustrate computer display screens provided for a user when inserting a chop into a document.

The signature insertion module 240 will now be described in connection with FIGS. 6, which provides a block diagram of one preferred embodiment of the signature insertion module 240, and 7A–7E, which illustrate displays that may be displayed on computer display 270. The general function of the signature insertion module 240 is to assemble the security information and to embed the assembled security information as a security object, for example, in the electronic document. The security information preferably includes an electronic chop. Initially, the user prepares an electronic document using a conventional application. In the example of FIG. 7A, the user has generated an expense report 710 using the Lotus 1-2-3™ application. Of course, the particulars of the example are intended to be illustrative of the invention and should not be considered limiting.

Figure 7B:
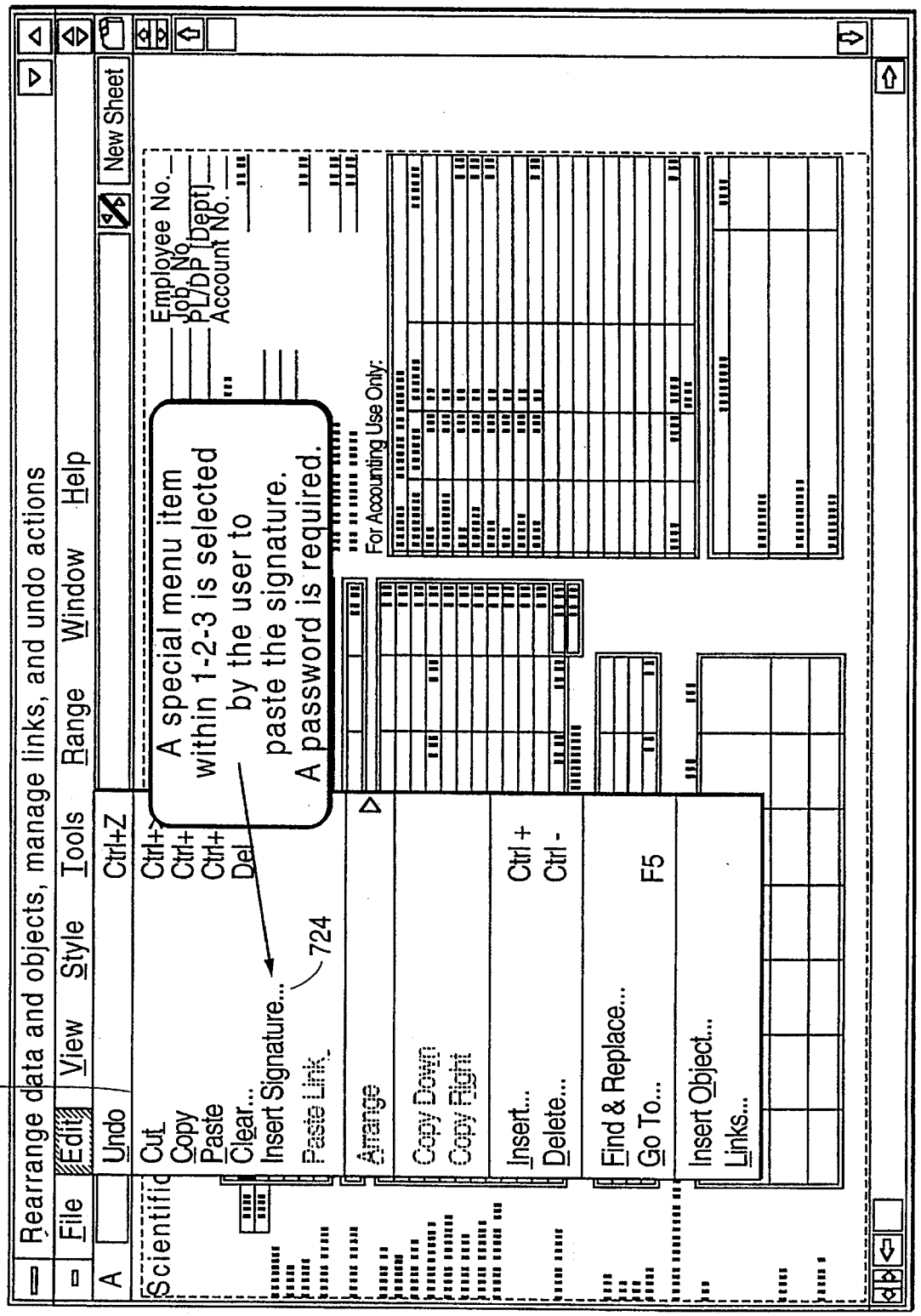
Figure 7C:
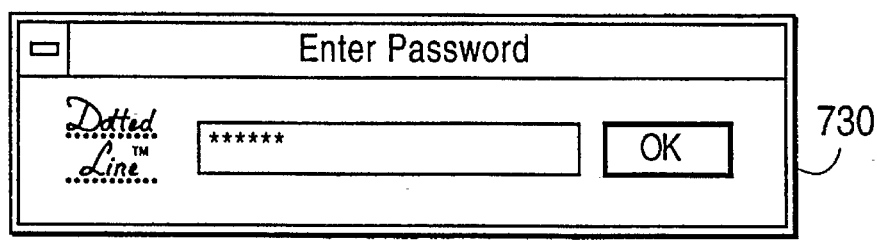
Figure 7D:
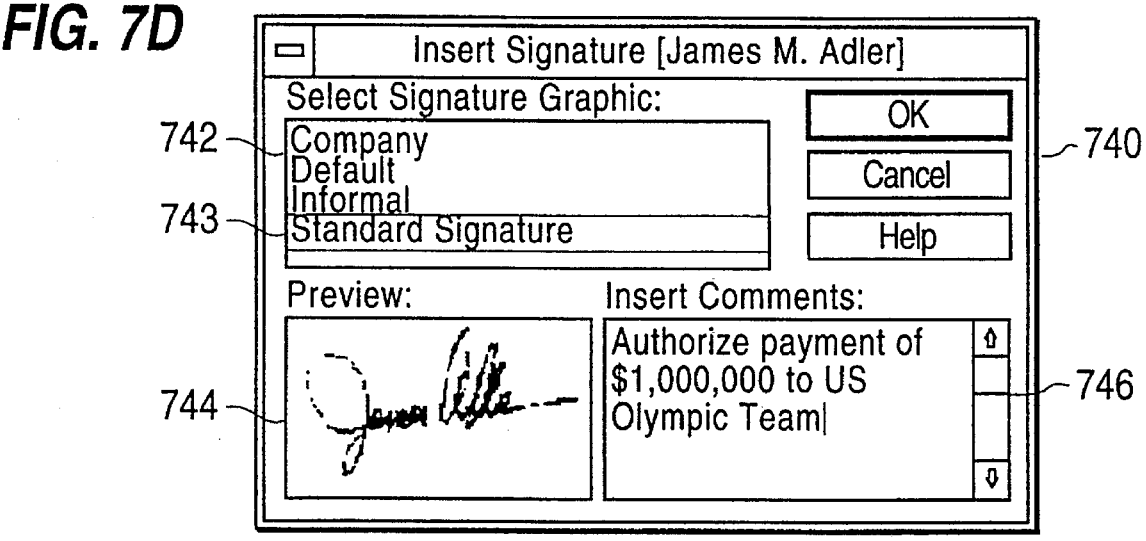
Figure 7E:
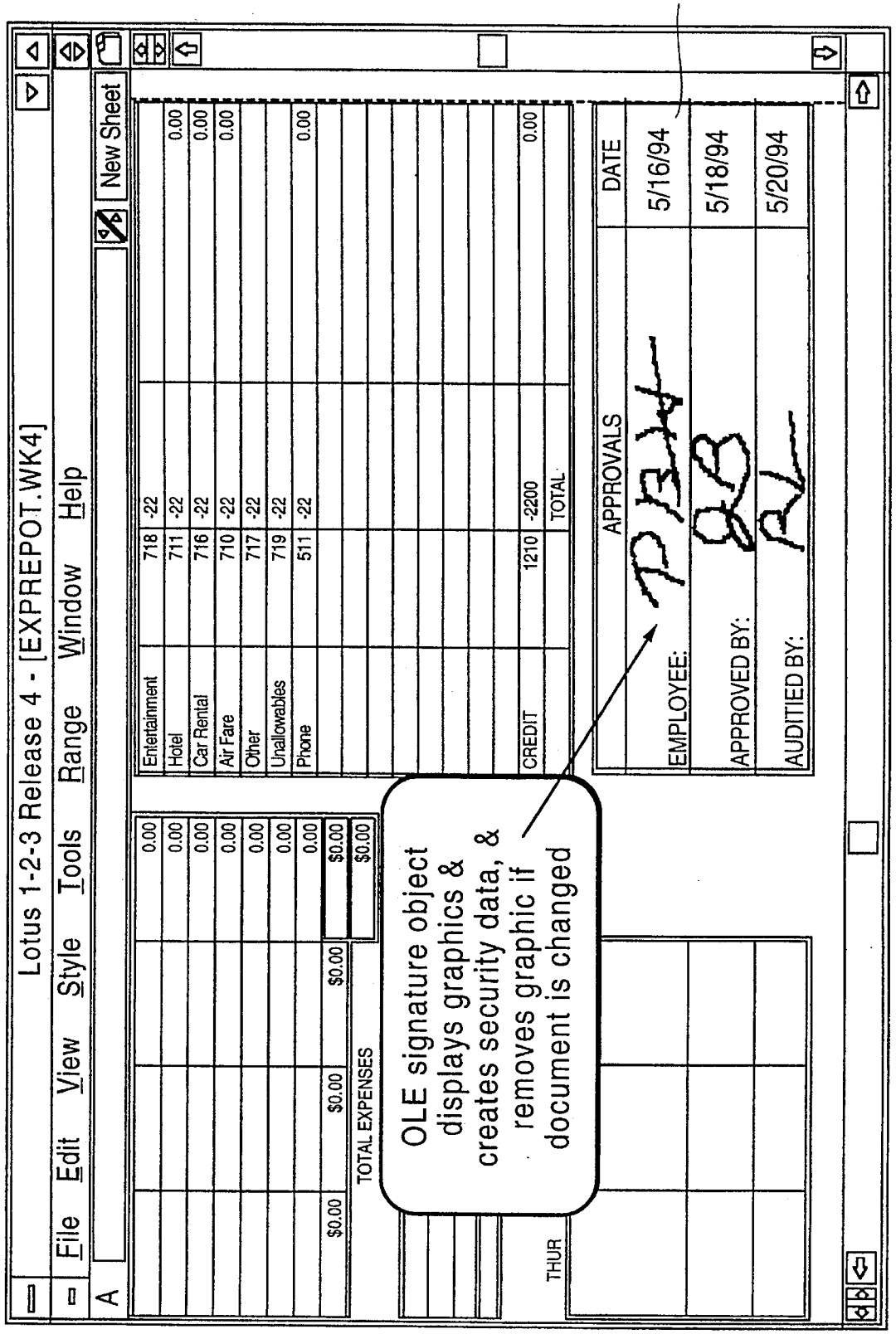

To insert an electronic chop in the document, the user first positions the cursor at a point in the electronic document where the electronic chop is to be inserted. The user then pulls down the <Edit> menu 712 by any conventional input device 260, such as, for example, a keyboard, a mouse, a tracking device, or other means. As shown in FIG. 7B, a pull down menu 722 having a number of options, including an <Insert Signature . . . > option 724, which was added to the manu by the installer module 210, is presented. The user then selects the <Insert Signature . . . > 724 option using any conventional selection device. In a preferred embodiment, the user is prompted to enter a password upon selection of the <Insert Signature . . . > 724 option, for example, using the interactive dialog 730 illustrated in FIG. 7C. Upon entry of the correct password, the user may be provided with an interactive dialog 740 as illustrated in FIG. 7D. Accordingly, the user may select a particular electronic chop from a list in a box 742 having a cursor 743 for selection, examine the selected electronic chop in a box 744, and insert comments in a box 746, among other options. For example, the user may size the chop graphic before and after insertion into the document. After setting available parameters, the user may enter an instruction, for example, by selecting an "OK" button, that causes a security object, including the selected electronic chop, to be embedded in the electronic document. Because the portion of the electronic document including the embedded security object is currently displayed on the display, the user's electronic chop 750 is ultimately displayed at the location of the cursor as shown in FIG. 7E. Details of the display operations are discussed below.

The operation of the signature insertion module will be discussed with reference to FIG. 6. As seen in FIG. 6, the signature insertion module 240 may comprise a security information assembler 610, encrypter 620, and security object embedder 630. In one preferred embodiment, the security information assembler 610, encrypter 620, and security object embedder 630 are implemented using software and the user's computer. Memory 640, also illustrated in FIG. 6, may or may not be considered part of the signature insertion module 240. Memory 640 may be RAM or disk drive internal to the user's computer, or may be part of an external memory source.

Upon entry of the command to embed a security object, the security information assembler 610 assembles the security information for embedding in the document in a predetermined format. Depending on the nature of the security information to be included in the security object, specific data items, for example, a hash value of the electronic document, may have to be generated. Accordingly, the security information assembler may include a serial number generator 612 for generating a unique serial number and a hash value calculator 614 for calculating a hash value based upon the current content of the electronic document. The security information assembler 610 may interact with memory 640 to provide information for the serial number generator 612 and the hash value calculator 614 to generate their respective outputs.

Alternatively or in addition, the security information assembler 610 may merely have to retrieve security information items, for example, the electronic chop, from memory 640. The security information assembler 610 arranges the generated information and the retrieved information into a predetermined format. When assembly of the security object is complete, the security information in whole or in part can inserted into the user's signature log, which may be stored in memory 640. Alternatively or in addition, particular items of the security information can be inserted into appropriate locations in the signature log as the security information is generated or retrieved.

As discussed above, the security information in the security object may be encrypted and/or stored in the clear. Encryption may be performed using encrypter 620 using keys stored in memory 640. Encryption of the security information prevents an unscrupulous user from, for example, modifying the electronic document and then updating the security information to correspond to the modified electronic document. Accordingly, encryption provides additional assurance that the signature is authentic and that the file has not been tampered with. However, even if encryption is not provided, a certain level of security is afforded. The intrinsic difficulty of working with security objects, such as OLE security objects, and personal directory security serves to prevent tampering by the typical computer user.

Of course, the nature of the encryption algorithm used to encrypt the security information will determine the level of security provided. For example, the security information may be scrambled using a simple algorithm to inhibit tampering with off-the-shelf file modification tools. Alternatively, the security information may be encrypted using a conventional private key encryption algorithm, such as the NIST Data Encryption Standard (DES). Access would be prohibited to anyone who does not know the private key. However, a person possessing the private key can verify signature authenticity and file integrity. According to this model, the signator will have the capacity to prove with a high degree of confidence that he signed or did not sign the electronic document if the issue is ever called into question.

The security information may be encrypted with a public key encryption algorithm such as the NIST Digital Signature Standard (DSS). This would provide a high level of confidence in signature authenticity and file integrity to anyone who has access to the signator's public key.

As noted above, in one preferred embodiment, three copies of each security information item may be assembled to form the security object. The first copy is not encrypted. The second copy is encrypted using private key encryption, such as a DES private key. This copy may be used for signature verification by the original signator. The third copy is encrypted using a public key technique, such as DSS. This third copy may be used for signature verification by a document receiver who possesses the public key. The encryption software used by the signature insertion module 240 is preferably modular so that alternative encryption techniques may be substituted if desired.

The security object embedder 630 receives the security information, whether encrypted, encrypted in part, or in the clear. In addition, the security object embedder 630 accesses the electronic document and an identifier that invokes verification processing, either directly or indirectly, for example, from memory 640 or otherwise. The security object embedder 630 embeds the security information and the identifier in the electronic document as a security object. The electronic document may then be stored or transmitted.

When the document is retrieved or received, the embedded signature interpreter module 250 is invoked either directly or indirectly by the identifier in the embedded security object. However, if a corresponding electronic document security application is not installed on the computer on which the document is being viewed, the security object may cause static text to be displayed. For example, the text "a security signature is pasted here" may be displayed within a round-cornered box. Of course, other indications may be provided such as an alert tone or a synthesized voice, either alone or in combination with a displayed message.

In general, the embedded signature interpreter module 250 interprets the embedded security object to verify the identity of the signator and/or the document integrity. For example, when the embedded security object lies within an area currently displayed on the display or when a page including the embedded security object is printed, the identifier in the embedded security object invokes processing by the embedded signature interpreter module 250 either directly or indirectly. For example, as discussed in greater detail below, when the present invention is used in connection with the WINDOWS™ operating system, the application used to access the document invokes the OLE capability in the WINDOWS™ operating system, which passes control to the embedded signature interpreter module 250 of the electronic document security application 120, as will be discussed in greater detail below in connection with FIG. 8.

Figure 8:
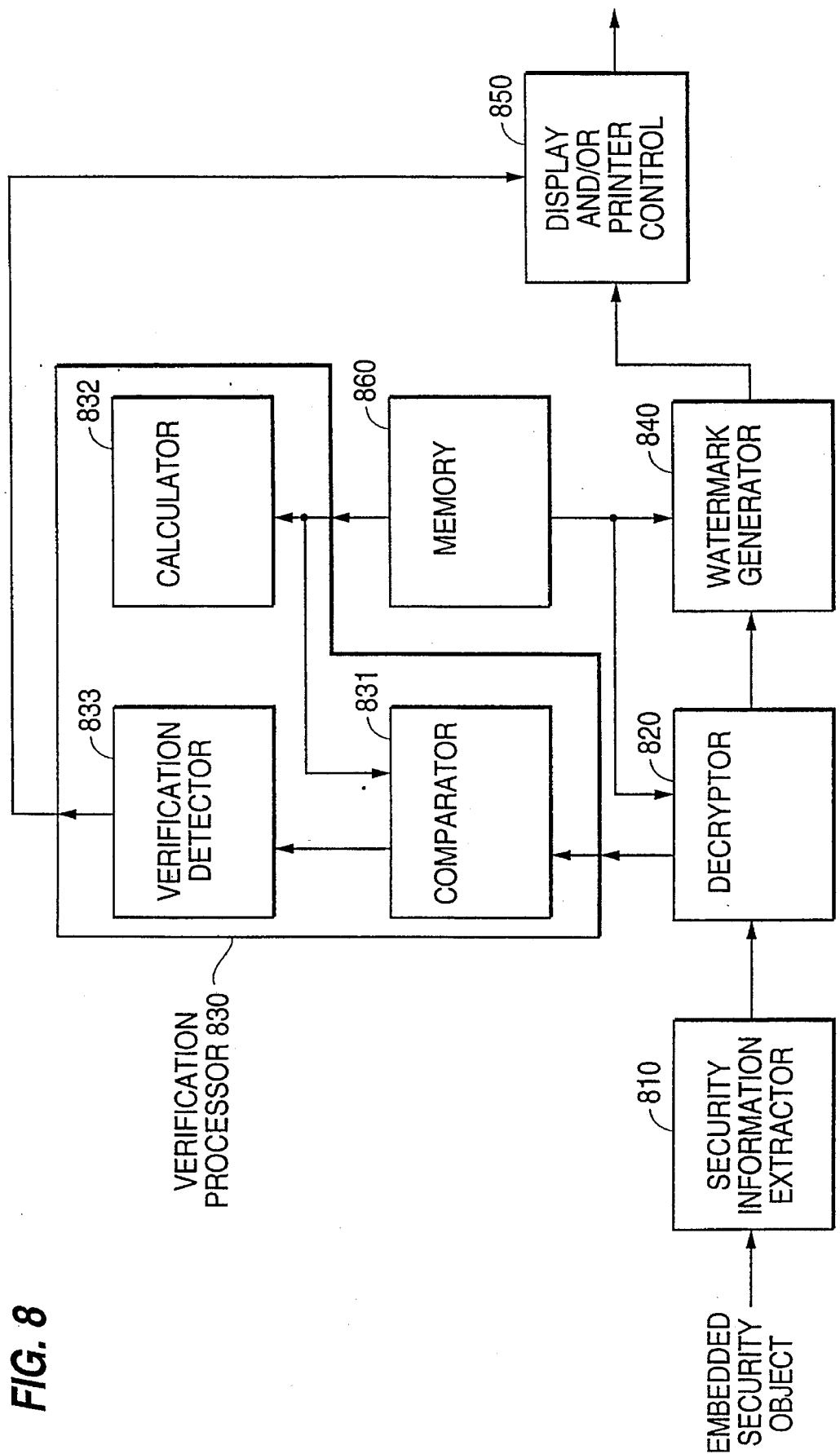
FIG. 8 provides a representation of an embodiment of the embedded signature interpreter module illustrated in FIG. 2.

FIG. 8 provides a representation of an embodiment of the embedded signature interpreter module 250 including a security information extractor 810, a decrypter 820, a verification processor 830, a watermark generator 840, and a display and/or printer controller 850, which are preferably implemented by software and the document reviewer's computer. A memory 860, which may or may not be part of the embedded signature interpreter module, is also depicted.

The security information extractor may extract the security information from the embedded security object. The extracted security information may be decrypted using the decrypter 820. Of course, where the embedded security object includes unencrypted security information, the decrypter 820 may be bypassed, omitted, or pass the unencrypted security information without additional processing. The security information is then passed to the verification processor 830, which performs verification processing. As illustrated in FIG. 8, the verification processor 830 may include a comparator 831, a calculator 832, such as a hash value calculator, and a verification detector 833. The comparator 831 compares the security information to corresponding values retrieved from memory 860 and/or generated by calculator 832.

For example, one or more data items of the document digest may be calculated by the calculator 831 based upon the current state of the electronic document. For convenience, such data items shall be referred to as calculated items. The calculator 832, for example, may calculate a hash value using the NIST standard Secure Hash Algorithm. The comparator 831 then compares the calculated item or items of the document digest to the corresponding item or items of the document digest embedded in the security object. The comparator may, in addition or alternatively, compare an item or items stored in memory 860 to corresponding data items from the embedded security object. Of course, whether a data item is calculated or retrieved depends on the nature of the information the data item represents.

The output of the comparator 831 is used by the verification detector 833 to generate the verification result. Thus, if each calculated or retrieved item matches a corresponding embedded item, the integrity of the document is verified by the verification detector 833. However, the modification of the electronic document can be detected by verification detector 833 when any calculated or retrieved item does not match a corresponding embedded item. Similarly, an item or items included in the signature digest can be verified by comparison to corresponding calculated or retrieved values.

The verification results from the verification processor 830 may be indicated to the document reviewer, for example, by displaying or printing a message, sounding an alarm, generating a synthesized speech message, or a combination. According to a preferred embodiment illustrated in FIG. 8, the signator's electronic chop extracted from the embedded security object may displayed or printed to indicate that the verification results. Specifically, the verification result may be passed to the display and/or printer controller 850 which selectively causes a representation of the electronic chop to be displayed or printed. The signator's electronic chop is not displayed or printed if any characteristic of the electronic document was not verified. A warning message may be generated to indicate that verification failed and the reason for failure. The displayed electronic chop will be referred to hereinafter as the video chop. The printed electronic chop will be referred to hereinafter as the printed chop.

As illustrated in FIG. 8, the signature interpreter module 250 includes a watermark generator 840, which provides an added measure of security. However, it should be understood that the watermark generator is not required. Alternatively, the watermark generator may be separately provided in order to generate video and/or printed watermarks to authentic displays for applications unrelated to the electronic document security application. The watermark generator generates an electronic watermark, an electronic representation of a difficult-to-forge image or icon as will be discussed below. The watermark generator 840, as illustrated in FIG. 8, preferably generates an electronic watermark based upon information included in the document digest and/or signature digest of the embedded security object. In one preferred embodiment, security information indicative of the signator (such as, signator's name, various identifications, etc.) is used to generate the electronic watermark. However, it should be understood that the watermark generator 840 may generate an electronic watermark based on any display for which authentication is desired.

Display of the electronic watermark generates a difficult-to-forge video watermark. For example, the video chop may be superimposed on the video watermark when displayed on a document reviewer's display to indicate the verification result. The video watermark provides security against programs written to mimic the electronic document security application. More generally, the video watermark may be used to authenticate any display that may be imitated by a "Trojan Horse" program.

The video watermark may be a static or time dependent. In one preferred embodiment, the time dependent video watermark varies according to a complex algorithm based on, for example, the time of day in addition to security information in the embedded security object. The algorithm may reside in the electronic document security application in an encrypted form. One suitable algorithm may be, for example, a non-linear dynamic system tuned to a chaotic regime, such as the Lorenz System, as will be described below.

Time-variation may be exhibited to the document reviewer by a changing icon. The icon may have numerous states or at least one state which may be easily described. In one preferred embodiment, for example, the video chop may be displayed superimposed over a display box that exhibits a color that varies with time. Of course, other time-varying displays may be used, for example, a rotating vertical line or bar having variable length.

Figure 10:
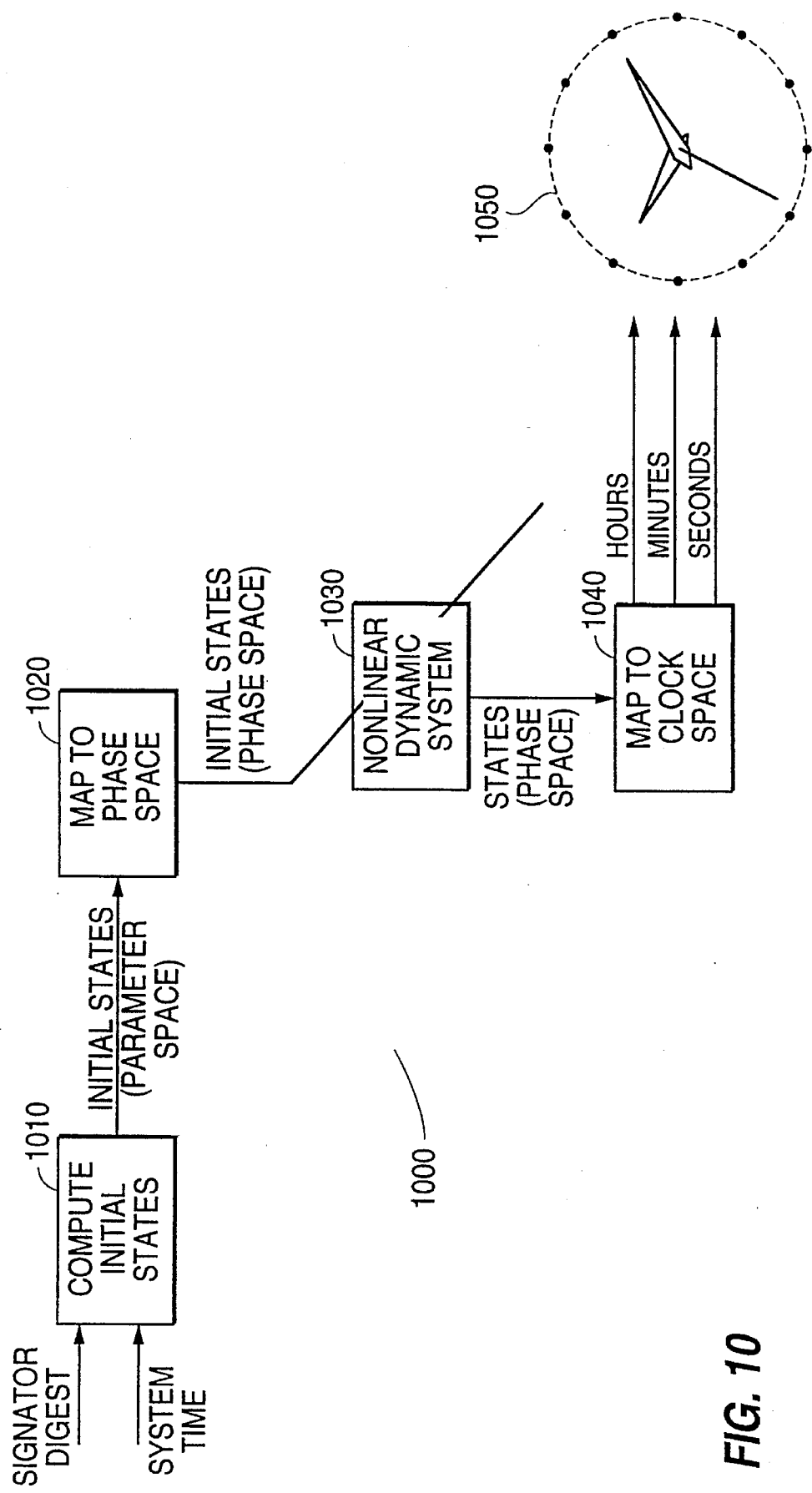
FIG. 10 illustrates a representation of a watermark generator in accordance with the present invention.

In one preferred embodiment, the icon may be a clock face whose arms change chaotically as a function of a nonlinear dynamic system. FIG. 10 provides a representation of a watermark generator 1000 for generating a clock graphic having hours, minutes, and second hands. Initial states for the nonlinear dynamic system can be calculated from a combination of the security information and the system time as illustrated at 1010. The nonlinear dynamic system is extremely sensitive to initial conditions. However, to ensure that the same trajectory is not output each time the watermark generator is initialized to display an icon, the security information parameters may be equalized to the system time and summed. Specifically, the magnitudes of the security information parameters and/or the system time may be adjusted to guarantee mutual sensitivity before summing. Thus, neither the security information parameters nor the system time will dominate the sum.

The resulting sum may then be mapped to phase space to serve as the initial states of the dynamic system as illustrated at 1020. The nonlinear dynamic system 1030 may be propagated in time to generate output values that may be mapped to clock space (i.e., hours, minutes, and seconds) as illustrated at 1040. The clock graphic 1050 may then be driven using the hours, minutes, and seconds output from the non-linear dynamic system. The time dependent video watermark may further include the date and time of signature insertion, the signator's name, current date and time, among other items of information.

The nonlinear dynamic system may be, for example, the Lorenz System described by the following set of equations:

$$\overline{x} = a(y-x) \quad (1)$$

$$\overline{y} = (b-z)x - y \quad (2)$$

$$\overline{z} = xy - cz \quad (3)$$

Figure 11:
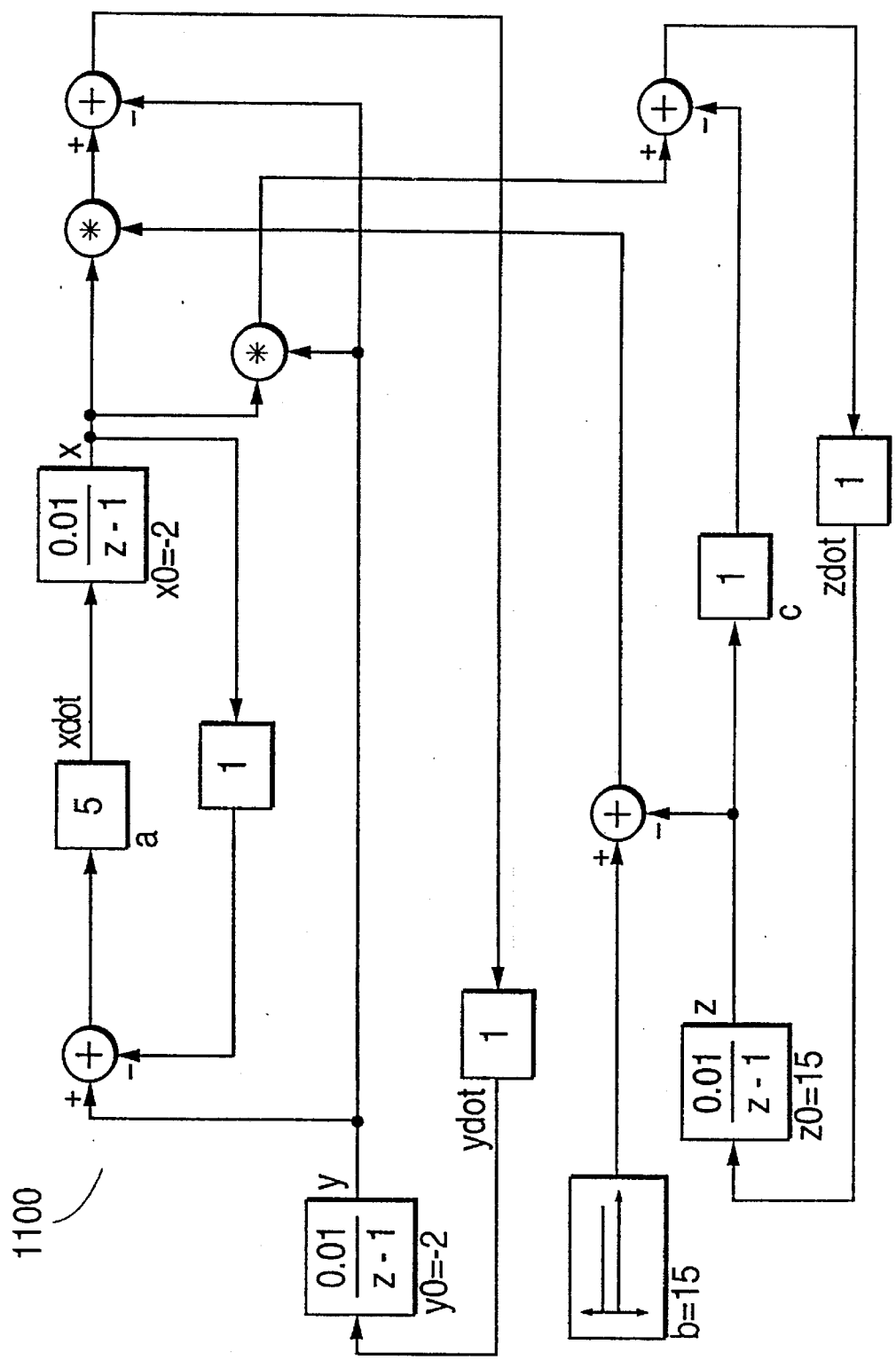
FIG. 11 illustrates a discrete-time implementation of the Lorenz System used to generate a time-dependent watermark graphic.

FIG. 11 illustrates a discrete-time implementation 1100 of the Lorenz System having initial states of $(x,y,z)=(-2, -2, 15)$. Because parameters a, b, and c are critical to keep the system in chaotic regime, they are fixed at compile time. The chaotic trajectory of the clock hands appears random to an observer, but are completely predictable given a set of parameter values and initial states. Further, the movement of the clock hands changes in discrete stages.

The video watermark may serve to inhibit forgery as follows. The document reviewer may compare the displayed video chop and video watermark with a displayed video chop and video watermark processed and displayed using another computer. For example, the document reviewer may telephone another party and request the time of day that the clock face video watermark displays. If the displayed times do not match, the document reviewer can detect a forgery. Thus, the document viewer can guard against so-called "trojan horse" programs that attempt to mimic the display features of the electronic document security application or another application selected by the user. If the watermark is generated using information particular to the signator, then the watermark may be confirmed against any electronic document signed by the signator.

The video watermark may be used to provide a secure integrity indicia in many applications other than that just described. For example, in the past, malicious persons have circulated various pieces of software which alter or damage any computer system on which they reside. Two general classes of such software exist: viruses and Trojan Horses. Viruses add small quantities of executable code to previously existing applications, thereby changing their structure in a destructive manner. Anti-virus utilities attempt to detect and remove viruses before they can cause damage and/or repair damage which has already occurred.

As noted above, "Trojan Horses" mimic known benign applications thereby encouraging the unwary user to load them onto the user's computer and execute them. However, certain Trojan Horse programs take destructive actions when executed. As a further example of this class, an insidious virus may create a Trojan Horse which replaces and then mimics a known anti-viral utility, thereby preventing eradication of the virus.

It is clear that a computer user may desire a secure indication of a specific application's integrity, i.e. that it is not infected by a virus and that it has not been replaced by a Trojan Horse which is superficially mimicking the application. In graphically oriented computer systems, each application is typically represented by an icon. If that icon is superimposed on a video watermark such as that just described, the user may be confident that the application is genuine rather than a Trojan Horse. Additionally, if the watermark is controlled by a separate piece of software which also verifies the application's integrity by some means, such as by use of a hash value, the video watermark may also indicate that the application has not been modified through the insertion of a virus.

As noted above, the document reviewer may also print the electronic document on a conventional printer. In such a case, the electronic chop will print substantially as displayed to produce a printed chop. According to one preferred embodiment, the printed chop may be superimposed on a printed watermark generated by the watermark generator 840 to thereby make it more difficult to forge a paper copy of the document. The printed watermark may or may not be the same as a displayed static video watermark. The printed watermark may be a barcode or other glyph that is difficult to forge, for example, by photocopying. In one preferred embodiment, the printed watermark may consist of document digest and/or signature digest data items printed continuously in a very small font throughout the area of the electronic chop, so as to visually appear as a nearly uniform gray area. For example, the printed watermark may include data items such as the number of pages in the document, number of characters, number of characters per page, etc. from the security information. These data items may be arranged randomly to deter alteration. The font may be chosen based upon printer resolution to impede xerography.

As noted above, one preferred embodiment of the security object includes an unencrypted copy of the security information, a copy of the security information encrypted using a private key, and a copy of the security information encrypted using a public key. In that preferred embodiment, the embedded signature interpreter module 250 interprets this security information as follows. When the document reviewer displays a portion of the electronic document that includes the embedded security object, the embedded signature interpreter module 250 performs verification processing using the unencrypted security information, and displays the video chop if verification is successful. If verification is unsuccessful, a warning message is generated to indicate that the electronic document was modified. No video watermark is displayed responsive to verification processing based on unencrypted security information.

The embedded signature interpreter module 250 further seeks to locate the public key using the default directory path specified by the document reviewer. If the public key cannot be located, a watermark is not displayed. If the public key is located, the public key encrypted security information is decrypted and verification processing is performed using the decrypted security information. The video chop is superimposed over the video watermark if verification processing is successful. The video watermark is not displayed if verification is unsuccessful. Rather, a warning message is generated.

The private key encrypted security information is subjected to verification processing only during <Scrutinize Signature> operations, which will now be discussed. After opening the electronic document, a document reviewer may select a security object embedded in the electronic document, for example, by clicking on it once using a mouse. As noted above, the document reviewer may be the signator or another person who receives or otherwise accesses the electronic document. The user may then pull-down the <Edit> menu and select the <Scrutinize Signature> menu item. Alternatively, the document reviewer can, for example, double click on the embedded security object to actuate the <Scrutinize Signature> processing. Of course, <Scrutinize Signature> processing may be invoked by other known techniques.

Figure 9A:
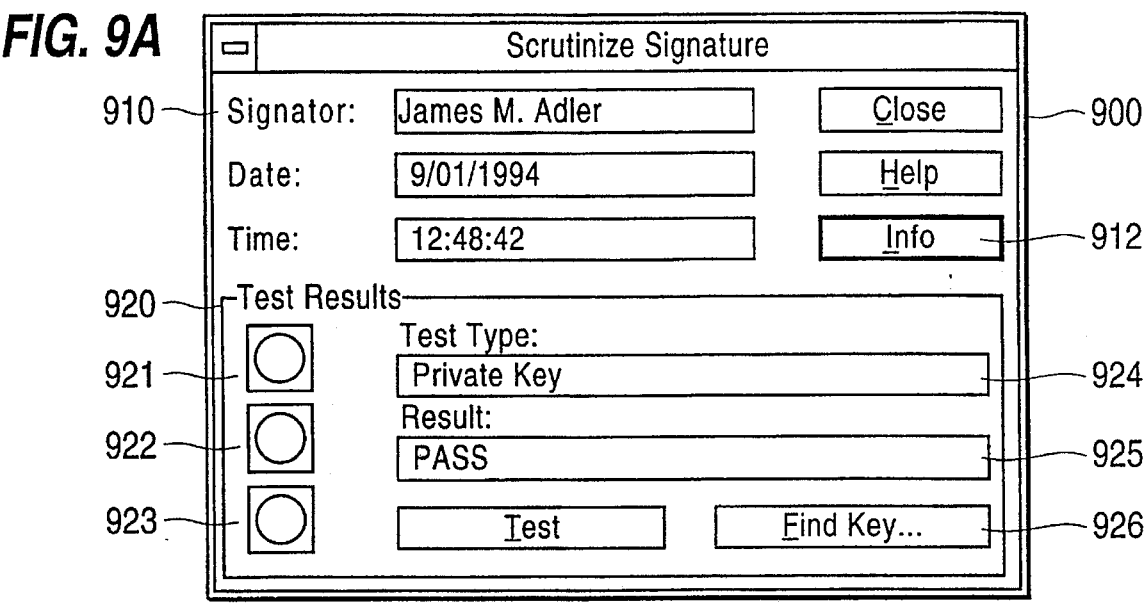
FIGS. 9A–9C illustrate display screens used in conjunction with the <Scrutinize Signature> feature of the present invention.
Figure 9B:
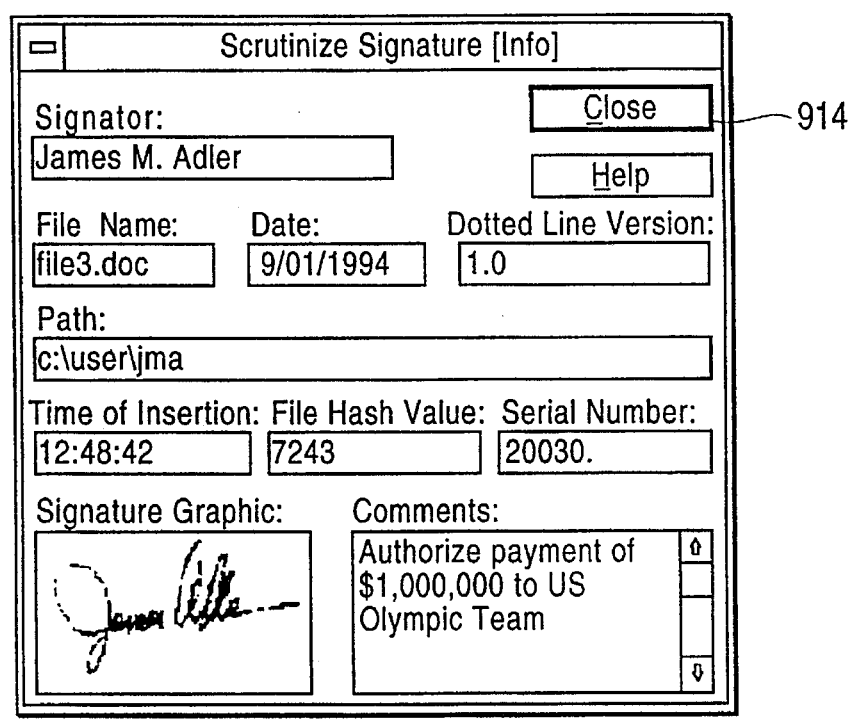

In response to the <Scrutinize Signature> command, the embedded signature interpreter module 250 retrieves the public key of the public key pair and the private key if they can be located at the location selected, e.g. during installation. In addition, a "Scrutinize Signature" window 900, such as that illustrated in FIG. 9A, will be presented on the display. The Scrutinize Signature window 900 includes an information section 910 which provides several items of security information, such as the name of the signator, date and time that the security information was embedded, serial number and hash value. If the document reviewer desires additional information, an <info . . . > button 912 may be selected to display an additional information window 914, such as that illustrated in FIG. 9B, that provides additional information.

The Scrutinize Signature window 900 further includes a test results section 920 having, for example, three stoplight icons 921, 922, and 923 that indicate the verification results using the unencrypted or scrambled security information, public key-encrypted security information, and private key-encrypted security information. In addition, the test results section 920 includes a test type input field 924 whereby the document reviewer may select between verification using the public key-encrypted security information or private key-encrypted security information.

The test results section 920 further includes a result field 925 which indicates the verification results such as "Pass", "Fail", "Key Not Found—No Test", and "Signature Log Not Found". The "Fail" indication may also provide the reason for such failure, such as that the embedded security information did not match the signature log. The stoplight icons 921, 922, 923 may provide a color-coded indication of the verification test results. For example, green may indicate that the required key has been obtained, decryption performed, and verification was successful. Yellow may indicate that the required key could not be found. Red may indicate that the required key was found, but that verification failed.

Figure 9C:
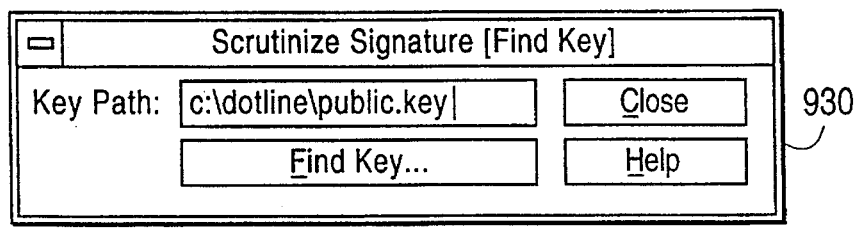

If a yellow stoplight icon is presented, the document reviewer may seek to change the default location for retrieving the requisite key, for example, by selecting the <Find Key . . . > button 926 in the Scrutinize Signature window 900. The user may then be presented with a Find Key window 930, as illustrated in FIG. 9C, having a key path input field 935. The document reviewer may then enter a new location into key path input field 935 and repeat the verification testing. In addition, a Find Log window (not shown) may be provided so that the document reviewer can enter a path input for accessing a signature log. In this way, a document reviewer may access his signature log from another computer connected to the network. Of course, the document reviewer may be required to enter a proper password in order to access the signature log.

If verification testing using the password or private key is selected, the embedded signature interpreter module 250 then attempts to decrypt the encrypted security information using the entered private key. The embedded signature interpreter module 250 compares the decrypted security information from the embedded security object with that stored in the signator's signature log. For example, the signature digest of the decrypted security information may include the serial number assigned when the security object was embedded. This decrypted serial number may be compared with the serial number stored in the signature log. Accordingly, the signator can prove whether or not he actually signed the document if the issue arises. Of course, other data items in either the signature digest or the document digest may be compared to corresponding values stored in the signature log. In addition, such comparison can be performed when the embedded security information is not encrypted.

When verification testing using the public key is selected, the embedded signature interpreter module treats the document reviewer as a document receiver and attempts to decrypt the encrypted security information using the retrieved public key. The identity of the signator can be verified, for example, by inspecting the name of the signator included in the signature digest of the decrypted security information. Other data items contained in the signature digest may likewise be inspected, such as LAN address or directory specification, for example. The document reviewer may thus be assured that each such data item has not been modified since the security object was embedded in the electronic document. Accordingly, the embedded signature interpreter module 250 can verify the identity of the actual signator with a high degree of confidence.

In one embodiment of the invention, private key testing may be implemented by default when the document reviewer is the signator. For example, the electronic document security application may presume that the document reviewer is the signator if the private key can be found and that the document reviewer is another if the private key cannot be found. In such a case, verification testing may include comparison of the private key-encrypted hash value with a calculated hash value and comparison of private key-encrypted security information with corresponding information stored in the signator's signature log. In addition, the same comparisons may be made using the public key-encrypted information. Public key testing may be implemented by default when the document reviewer is someone other than the signator. In such a case, verification testing may include a comparison of the public key-encrypted hash value with a calculated hash value.

The processing described in the proceeding paragraphs may also serve to inhibit a user from registering an electronic chop that would appear to refer to another person, for example, if "John Smith" registered an electronic chop corresponding to the digitized signature "John Doe". The purported signator, i.e. John Doe, could prove that his electronic chop was forged by establishing that his signature log does not include an entry that corresponds to the security object embedded in the electronic document in question. Also, decryption of the security information using the purported signator's public key may not yield rational results. Accordingly, the document reviewer may verify that the actual signator is not the purported signator.

When the public key or private key or password is retrieved, the embedded signature interpreter module 250 may additionally verify whether the electronic document was modified based upon the document digest in the decrypted security information, if a document digest is provided. Verification may be accomplished, as discussed above, by calculating or retrieving data items corresponding to the data items included in the document digest based upon the current state of the electronic document. The calculated items may then be compared to the data items of the document digest from the decrypted security information to verify whether or not the electronic document was modified.

The document reviewer may wish to add an embedded security object including his electronic chop to the electronic document to manifest his approval of its contents. This may be done by invoking the signature insertion module 240 as discussed above. Embedding a security object in an electronic document that already includes an embedded security object inserted by another is not considered a document modification and will not interfere with the verification processing of the other embedded security objects. Further, any embedded security object may be deleted, for example, by selecting the security object in the electronic document in which it is embedded and pressing a DELETE key on a standard keyboard.

In one preferred embodiment, the present invention is used in conjunction with the WINDOWS™ operating system that includes object linking and embedding (OLE) feature, preferably OLE version 2.0, having an OLE controller. A general description of the interaction between the OLE controller, the electronic document security application, and the host application will now be provided. Initially, the installer module 210 registers a unique security object identifier, for example, a string or a number, with the OLE controller. In addition, the installer module 210 identifies to the OLE controller a file which contains a security object interpreter capable of processing the security information within the embedded security object, for example, the embedded signature interpreter module. Accordingly, the OLE controller maintains an association between the particular security object identifier and the embedded signature interpreter module which processes the security information.

When an security object is embedded, the signature insertion module 240 includes the security object identifier in the embedded security object. When an OLE-compatible host application that creates the electronic document encounters an OLE security object, for example, in an effort to display or print a portion of the electronic document including the OLE security object, it invokes the OLE controller. Using the security object identifier, the OLE controller ascertains the associated embedded signature interpreter module and passes control thereto for verification processing including electronic chop display or printing. When processing is complete, the embedded signature interpreter module returns control to the OLE controller, which then returns to the host application that created the electronic document. Of course, the above description is intended to be illustrative of one possible mode in which the present invention can operate and should not be considered to limit the present invention.

In one preferred embodiment, the software of the electronic document security application is implemented using object-oriented programming (OOP). In particular, the capabilities of the present invention may be implemented using a set of OOP classes within the OLE environment. These classes are instanced to form the installer module 210, the controller module 220, the signature insertion module 240, and the embedded signature interpreter module 250 illustrated in FIG. 2. The menu handler module 230 may be implemented outside the OLE environment to provide the <Insert Signature> option on the application menus.

OOP provides several advantages, for example, the software may be constructed of objects, each of which being analogous to a hardware unit, possessing well-defined interfaces and properties. Further, OOP is the preferred paradigm for interaction and resource control, such as printer and display, with most graphically-oriented operating systems. In addition, the interfaces to OLE 2.0 and to most other WINDOWS™ features are provided by the Microsoft Foundation Classes 2.5 and are most conveniently accessed using OOP. Using OOP also allows integration of new software objects with the existing OLE version 2.0 and WINDOWS™ components in a straightforward manner. Finally, OOP facilitates transportability, reusability, and maintainability by providing the means to form functionally complete units (i.e., objects) which require minimal modification to implement new features or to operate in a new environment.

Software implemented using OOP can be embodied in a number of classes. For example, a Document class may hold security object data and process most user commands. A View class may display security object data. A PasswordDialog class can get a password from a user. A ChangePasswordDialog class can get a new password from the signator. A SelectSignatureDialog class may allow a signator to select an electronic chop for insertion and to add comments. A LogDialog class may implement the signature log. A Password class may perform password operations such as retrieval and comparison. A Log class may hold security information, encrypted password, and digitized signature graphics. A Hasher class may perform hashing operations on the electronic document. An Encrypter class may perform encryption and decryption operations. A Watermark class may generate and display video and printed watermarks.

For example, the installer module 210 may be implemented using the Document class, the PasswordDialog class, the Log class, and the UserNameDialog. The controller module 220 can be implemented using the Document class, the Password class, the PasswordDialog class, the Log class, the ShowLogDialog class, and the ChangePasswordDialog class. The signature insertion module 240 can be implemented using the Document class, the Password class, the PasswordDialog class, the Log class, the SelectSignatureDialog class, the Hasher class, and the Encrypter class. The embedded signature interpreter module 250 can be implemented using the Document class, the Password class, the PasswordDialog class, the Log class, the Hasher class, the Encrypter class, the View class, and the Watermark class.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

We claim:

1. An apparatus for embedding select information in an electronic document, comprising:

an information assembler, responsive to a user's request, for assembling said select information into a predetermined format; and an object embedder for embedding said select information and information for invoking a predetermined application for processing said select information in an electronic document.

2. The apparatus according to claim 1, wherein said select information includes an electronic chop associated with the user.

3. The apparatus according to claim 1, further comprising an encrypter for encrypting the select information.

4. The apparatus according to claim 3, wherein said encrypter encrypts the select information using private key encryption.

5. The apparatus according to claim 3, wherein said encrypter encrypts the select information using public key encryption.

6. The apparatus according to claim 1, wherein said information assembler comprises a calculator for calculating a data item that characterizes the current state of the electronic document, wherein said select information includes said data item.

7. The apparatus according to claim 6, wherein said data item comprises a hash value of the electronic document.

8. The apparatus according to claim 6, wherein said electronic document comprises a text portion including character information and a code portion for controlling a presentation of the character information, and wherein said data item comprises a data item that characterizes the text portion of said electronic document.

9. The apparatus according to claim 1, further comprising a serial number generator, and wherein said select information includes said serial number.

10. The apparatus according to claim 1, wherein said select information comprises a public key-encrypted value indicative of said apparatus for embedding the information in the electronic document.

11. The apparatus according to claim 1, wherein said object embedder is an OLE object embedder.

12. The apparatus according to claim 1, wherein said information for invoking a predetermined application for processing said select information comprises an identifier that identifies the predetermined application.

13. The apparatus according to claim 1, wherein said object embedder embeds said select information and information for invoking processing of said select information in the electronic document at a location selected by the user.

14. An embedded object interpreter for verification of an electronic document, comprising:

an information extractor, responsive to an embedded object in an electronic document, for extracting select information from the embedded object; and a verification processor for verifying an aspect of said electronic document using said extracted select information.

15. The embedded object interpreter according to claim 14, wherein the select information includes an electronic chop associated with a party that caused the select information to be embedded in the electronic document, and said embedded object interpreter further comprises:

a display controller for controlling a display device to display the electronic chop in said electronic document only if said verification processor verifies said aspect of said electronic document.

16. The embedded object interpreter according to claim 15, further comprising a watermark generator for generating a watermark graphic, wherein said display controller, responsive to said watermark generator, controls the display device to display the electronic chop superimposed on said watermark graphic if said verification processor verifies said aspect of said electronic document.

17. The embedded object interpreter according to claim 16, wherein the watermark generator generates the watermark graphic using the extracted select information.

18. The embedded object interpreter according to claim 17, wherein the watermark graphic comprises a time-dependent watermark graphic.

19. The embedded object interpreter according to claim 18, wherein the time-dependent watermark graphic is predictable from the extracted select information and appears random.

20. The embedded object interpreter according to claim 14, further comprising a decrypter for decrypting the extracted select information.

21. The embedded object interpreter according to claim 20, wherein said decrypter decrypts said extracted select information using a private key.

22. The embedded object interpreter according to claim 20, wherein said decrypter decrypts said extracted select information using a public key.

23. The embedded object interpreter according to claim 14, wherein said extracted select information includes a value indicative of an object embedder used to embed the embedded object in the electronic document, and wherein said verification processor verifies the authenticity of the object embedder.

24. The embedded object interpreter according to claim 14, wherein said extracted select information comprises an extracted document digest including an extracted data item that characterizes the content of the electronic document at the time that the select information was embedded, and wherein said verification processor verifies electronic document integrity using the extracted document digest.

25. The embedded object interpreter according to claims 24, wherein said verification processor comprises:

a calculator for calculating a data item that characterizes a current content of the electronic document, said calculated data item corresponding to the extracted data item;

a comparator for comparing the extracted data item with the calculated data item; and a verification detector, responsive to said comparator, for detecting that said electronic document was modified if said extracted data item does not match said calculated data item and for detecting that said electronic document was not modified if said extracted data item matches said calculated data item.

26. The embedded object interpreter according to claims 25, wherein said extracted data item comprises an extracted hash value and said calculator calculates a hash value using the electronic document.

27. The embedded object interpreter according to claim 26, wherein the select information includes an electronic chop associated with a party that caused the select information to be embedded in the electronic document, and said embedded object interpreter further comprises:

a display controller for controlling a display device to display the electronic chop in said electronic document only if said verification detector detects that said electronic document was not modified.

28. The embedded object interpreter according to claim 27, further comprising a watermark generator for generating a watermark graphic, wherein said display controller, responsive to said watermark generator, controls the display device to display the electronic chop superimposed on said watermark graphic if said verification detector detects that said electronic document was not modified.

29. The embedded object interpreter according to claim 14, wherein said extracted select information includes an extracted serial number and said verification processor verifies the identity of the party that caused the select information to be embedded in said electronic document by comparing said extracted serial number to a stored serial number.

30. The embedded object interpreter according to claim 29, wherein the select information includes an electronic chop associated with a party that caused the select information to be embedded in the electronic document, said embedded object interpreter further comprising:

a display controller for controlling a display device to display the electronic chop in said electronic document only if said verification processor verifies the identity of the party that caused the select information to be embedded in said electronic document.

31. The embedded object interpreter according to claim 30, further comprising a watermark generator for generating a watermark graphic, wherein said display controller, responsive to said watermark generator, controls the display device to display the electronic chop superimposed on said watermark graphic if said verification processor verifies the identity of the party that caused the select information to be embedded in said electronic document.

32. An electronic document verification system, comprising:

an information assembler, responsive to a user's request, for assembling select information into a predetermined format;

an object embedder for embedding an object into a target electronic document at a location selected by the user, wherein the embedded object includes the assembled select information and an identifier for invoking processing of the select information;

an embedded information extractor, responsive to an embedded object in a signed electronic document, for extracting select information from the embedded object; and a verification processor for processing said extracted select information to verify an aspect of said signed electronic document.

33. The electronic document verification system according to claim 32, further comprising:

an encrypter for encrypting the assembled select information; and a decrypter for decrypting the extracted select information.

34. The electronic document verification system according to claim 33, wherein said encrypter encrypts the assembled select information using public key encryption and said decrypter decrypts said extracted select information using public key decryption.

35. The electronic document verification system according to claim 33, wherein said encrypter encrypts the assembled select information using private key encryption and said decrypter decrypts said extracted select information using private key decryption.

36. The electronic document verification system according to claim 32, wherein:

said information assembler comprises a first hash value calculator for calculating a hash value of the target electronic document, wherein the hash value is included in said assembled select information; and said verification processor comprises a second hash value calculator for calculating a hash value of the signed document, a comparator for comparing the calculated hash value with a hash value in the extracted select information, and a verification detector, responsive to said comparator, for detecting that the signed electronic document was modified if the calculated hash value differs from the hash value in the extracted select information and for detecting that the signed electronic document was not modified if the calculated hash value matches the hash value in the extracted select information.

37. The electronic document verification system according to claim 32, further comprising:

a serial number generator for generating a serial number associated with the instance of the users request, wherein said information assembler includes the serial number in the select information; and a memory for storing said select information assembled by said information assembler, including the serial number, wherein said verification processor comprises a comparator for comparing a serial number in the extracted select information with the stored serial number and a verification detector for detecting that the signed electronic document is authentic if said stored serial number matches the serial number in the extracted select information and for detecting that the signed electronic document is not authentic if the stored serial number does not match the serial number in the extracted select information.

38. The electronic document verification system according to claim 32, wherein said extracted select information includes an electronic chop, and further comprising:

a display controller for controlling a display device to display the electronic chop in the signed electronic document only if said verification processor verifies said aspect of said signed electronic document.

39. The electronic document verification system according to claim 38, further comprising a watermark generator for generating a watermark graphic, wherein said display controller, responsive to said watermark generator, controls the display device to display the electronic chop superimposed on said watermark graphic if said verification processor verifies said aspect of said signed electronic document.

40. The electronic document verification system according to claim 39, wherein the watermark generator generates the watermark graphic using the extracted select information.

41. The electronic document verification system according to claim 40, wherein the watermark graphic comprises a time-dependent watermark graphic.

42. The embedded object interpreter according to claim 41, wherein the time-dependent watermark graphic is predictable from the extracted select information and appears random.

43. An electronic document verification method for verifying the integrity of an electronic document having an object embedded therein, the embedded object including a document digest, said document digest including a data item indicative of the content of the electronic document at the time that the embedded object was embedded and chop graphics information associated with a party that caused the embedded object to be embedded in the electronic document, said electronic verification method comprising the steps of:

extracting the document digest and the chop graphics information form the embedded object;

calculating a data item indicative of a current content of the electronic document;

displaying the chop graphics data in the electronic document if the data item in the extracted document digest matches the calculated data item and displaying the electronic document without the chop graphics data if the data item in the extracted document digest does not match the calculated data item.

44. The method according to claim 43, wherein the document digest and the chop graphics data in said embedded object are encrypted, and said method further comprises the step of:

decrypting the extracted document digest and extracted chop graphics information.

45. The method according to claim 44, wherein said step of decrypting comprises decrypting the extracted document digest and the extracted chop graphics information using a private key.

46. The method according to claim 44, wherein said step of decrypting comprises decrypting the extracted document digest and the extracted chop graphics information using a public key.

47. The method according to claim 43, wherein the data item in the document digest comprises a hash value, and wherein said step of calculating comprises calculating a hash value based on the current content of the electronic document.

48. The method according to claim 43, wherein said step of displaying further comprises displaying a warning message in the electronic document if the data item in the extracted document digest does not match the calculated data item.

49. An electronic document verification system, comprising:

a verification processor for verifying an aspect of an electronic document approved by a signator; and an indication controller for presenting a chop graphic associated with the signator in the electronic document only if said verification processor verifies said aspect of said electronic document, wherein the chop graphic is omitted from said electronic document if said verification processor contradicts said aspect of said electronic document.

50. The electronic document verification system according to claim 49, wherein said electronic document is displayed on a display and said indication controller controls the display to display a video chop graphic associated with the signator in the displayed electronic document only if said verification processor verifies said aspect of said electronic document.

51. The electronic document verification system according to claim 50, further comprising an electronic watermark generator for generating an electronic watermark and for supplying the electronic watermark to said indication controller, wherein the electronic watermark generates a video watermark when displayed and wherein said indication controller controls the display to display the video chop graphic superimposed over the video watermark in the displayed electronic document only if said verification processor verifies said aspect of said electronic document.

52. The electronic document verification system according to claim 51, wherein said electronic watermark comprises information related to the signator and the electronic document.

53. The electronic document verification system according to claim 51, wherein said electronic watermark comprises a time-varying icon.

54. The embedded object interpreter according to claim 53, wherein the time-dependent watermark graphic is predictable from the extracted security information and appears random.

55. The electronic-document verification system according to claim 50, wherein said electronic document is printed using a printer and said indication controller controls the printer to print a printed chop graphic associated with the signator in the printed electronic document only if said verification processor verifies said aspect of said electronic document.

56. The electronic document verification system according to claim 51, further comprising an electronic watermark generator for generating an electronic watermark and for supplying the electronic watermark to said indication controller, wherein the electronic watermark generates a printed watermark when received by the printer and wherein said indication controller controls the printer to print the printed chop graphic superimposed over the printed watermark in the printed electronic document only if said verification processor verifies said aspect of said electronic document.

57. The electronic document verification system according to claim 52, wherein said electronic watermark comprises information related to the signator and the electronic document.

58. The electronic document verification system according to claim 57, wherein said printed watermark comprises the information related to the signator and the electronic document in a small font so as to appear substantially as a gray area.

59. The electronic document verification system according to claim 57, wherein said printed watermark comprises the information formatted randomly to thereby inhibit subsequent modification.

60. A verification system comprising:

an electronic watermark generator for generating a watermark icon that varies chaotically in time from a set of initial states; and a display controller for displaying the watermark icon on a display.

61. The verification system according to claim 60, wherein said electronic watermark generator generates a watermark icon that varies chaotically in discrete stages.

62. The verification system according to claim 61, wherein said watermark icon comprises a clock icon having at least an hour hand and a minute hand that varies chaotically in discrete stages.

63. The verification system according to claim 60, wherein said electronic watermark generator generates a watermark icon that varies in accordance with a Lorenz system.

64. The verification system according to claim 63, wherein said watermark icon comprises a clock icon having at least an hour hand and a minute hand that varies chaotically in discrete stages according to the Lorenz system.

65. The apparatus according to claim 1, wherein said select information includes security information.

66. The embedded object interpreter according to claim 14, wherein said select information includes security information.

67. The electronic document verification system according to claim 32, wherein said select information includes security information.

68. The method according to claim 43, wherein said embedded object includes security information.

* * * * *